United States Patent
Ahn et al.

(10) Patent No.: US 9,954,645 B2
(45) Date of Patent: *Apr. 24, 2018

(54) METHOD AND DEVICE FOR PROVIDING SECURE TRANSMISSION BASED ON POLAR CODE

(71) Applicant: LG ELECTRONICS INC., Seoul (KR)

(72) Inventors: Joonkui Ahn, Seoul (KR); Ilmin Kim, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 167 days.

This patent is subject to a terminal disclaimer.

(21) Appl. No.: 14/959,828

(22) Filed: Dec. 4, 2015

(65) Prior Publication Data

US 2016/0164629 A1 Jun. 9, 2016

Related U.S. Application Data

(60) Provisional application No. 62/087,799, filed on Dec. 5, 2014.

(51) Int. Cl.
*H03M 13/00* (2006.01)
*H04L 1/00* (2006.01)

(52) U.S. Cl.
CPC .......... *H04L 1/0041* (2013.01); *H04L 1/0009* (2013.01); *H04L 1/0057* (2013.01)

(58) Field of Classification Search
CPC ....... H04L 1/0041; H04L 9/00; H04L 1/0009; H04L 1/0057
See application file for complete search history.

(56) References Cited

U.S. PATENT DOCUMENTS

| | | | |
|---|---|---|---|
| 2013/0216221 A1* | 8/2013 | Zhang | H04L 1/0057 398/43 |
| 2016/0013810 A1* | 1/2016 | Gross | H03M 13/09 714/776 |
| 2016/0365977 A1* | 12/2016 | Boutros | H04L 9/085 |

OTHER PUBLICATIONS

Mandavifar et al in "Achieving the Secrecy Capacity of Wiretap Channels Using Polar Codes" (IEEE Trans. on Inf. Theory, vol. 57, pp. 6428-6443); Jun. 2010.*

* cited by examiner

*Primary Examiner* — Guy Lamarre
(74) *Attorney, Agent, or Firm* — Birch, Stewart, Kolasch & Birch, LLP

(57) ABSTRACT

A method and apparatus for providing a secure transmission based on a polar code are provided. A device generates an output bit sequence by applying a polar code generator matrix to an input bit sequence and transmits the output bit sequence to a target receiver. The input bit sequence includes first information bits, second information bits and third information bits. The first information bits correspond to gray bit channels for the target receiver and bad bit channels for an eavesdropper. The third information bits correspond to good bit channels for the target receiver and gray bit channels for the eavesdropper.

18 Claims, 34 Drawing Sheets

METHOD AND DEVICE FOR PROVIDING SECURE TRANSMISSION BASED ON POLAR CODE

CROSS-REFERENCE TO RELATED APPLICATIONS

This application claims the benefit of priority of U.S. Provisional application 62/087,799 filed on Dec. 5, 2014, all of which is incorporated by reference in its entirety herein.

BACKGROUND OF THE INVENTION

Field of the Invention

The present invention relates to a wireless communication, and more particularly a method and device for providing a secure transmission based on a polar code.

Related Art

In a communication system, the most efficient way to transmit data to a receiver is to use a channel code which guarantees good performance of error correction. Many kinds of channel codes have been studied and used. Typical channel codes include a convolution code, a Reed Solomon code, a turbo code, and an LDPC code. In particular, a polar code has been recently developed and satisfies a binary input channel capacity, and it is the first case to mathematically prove that the binary input channel capacity is satisfied. The polar code is made on the foundation that if a polar code generator matrix is used to transmit information bits, they are separate into bit channels not having errors and bit channels always having errors because the length of a code is long. It is called channel polarization. For this reason, desired information is transmitted to the bit channels not having errors and predetermined values are transmitted to bit channels always having errors. As such, the predetermined values are called frozen bits and, indeed, they can all transmit 0. As a result, a transmission rate is a value that is obtained by dividing the number of bit channels not having errors by the number of entire bit channels (that is, code length). If code length becomes greater infinitely, the transmission rate may infinitely become close to a channel capacity defined in information theory.

More specifically, the polar code can be explained as below. A polar code with length of n is transmitted by using binary input channels by n times. Each binary channel is presented as $W((y|x))$. Here, $x \in X$ indicates a transmitting signal, and $y \in Y$ indicates a receiving signal. In a case where N number of channels is independent, a vector channel may be generated as below:

$$W^n(y_1^n|x_1^n) = \pi_{i=1}^n W(y_i|x_i)$$ [Equation 1]

But, $x_1^n = (x_1, \ldots, x_n) \in X^n$ and $y_1^n = (y_1, \ldots, y_n) \in Y^n$. Second, if a polar code generator matrix $G_n$ with length of n×n, a composite channel may be generated as below:

$$\tilde{W}_n(y_1^n|v_1^n) = W^n(y_1^n|v_1^n G_n)$$ [Equation 2]

But, $v_1^n = (v_1, \ldots, v_n) \in X^n$ and $y_1^n = (y_1, \ldots, y_n) \in Y^n$. Lastly, $\tilde{W}_n$ is divided by n number of bit channels. The i-th bit channel defined in $X \to Y^n \times X^{i-1}$, $1 \le i \le n$ is given below:

$$W^{(i)}(y_1^n, v_1^{i-1} | v_i) = \frac{1}{2^{n-1}} \sum_{v_{i+1}^n \in X^{n-1}} \tilde{W}_n(y_1^n | v_1^n)$$ [Equation 3]

In the following, $W^{(i)}(y_1^n, v_1^{i-1}|v_i)$, is called the i-th bit channel and represented as in $W^{(i)}$.

Performance of each bit in a polar code can be interpreted when it comes to errors or mutual information. First, error performance of each bit channel is represented as a Bhattacharyya value.

$$Z(W^{(i)}) = \sum_{y_1^n \in Y_n} \sum_{v_1^{i-1} \in X^{i-1}} \sqrt{W^{(i)}(y_1^n, v_1^{i-1}|0) W^{(i)}(y_1^n, u_1^{i-1}|1)}$$ [Equation 4]

Second, performance of each bit channel may be represented as mutual information $I(W^{(i)})$. Binary input channels are considered in the present invention, so that it is found that $0 \le Z(W^{(i)}) \le 1$ and $0 \le I(W^{(i)}) \le 1$ is valid. Generally, $I(W^{(i)}) \approx 1$ iff $Z(W^{(i)}) \approx 0$, and $I(W^{(i)}) \approx 0$ iff $Z(W^{(i)}) \approx 0$. The n number of bit channels in the polar code may be separate into a good channel set ($\hat{\mathcal{G}}_n(W)$) not having errors and a bad bit channel set ($\tilde{\mathcal{B}}_n(W)$) always having errors.

$$\hat{\mathcal{G}}_n(W) = \{i \in [1,n] : Z(W^{(i)}) < 2^{-n^\beta}/n\}$$ [Equation 5]

$$\tilde{\mathcal{B}}_n(W) = \{i \in [1,n] : Z(W^{(i)}) \ge 2^{-n^\beta}/n\}$$ [Equation 6]

But, if $$\beta < \frac{1}{2},$$

In this case, the following property is valid:

$$\lim_{n \to \infty} \frac{|\hat{\mathcal{G}}_n(W)|}{n} = I(W)$$ [Equation 7]

Based on the above property, using the polar code, information is transmitted to the good bit channel and frozen bits are transmitted to the bad bit channels, so that a channel capacity may be achieved. Indeed, when a polar code is constructed, a block decoding error probability $P_{err}$ may be limited as below:

$$\max{}_{i \in \mathcal{A}} Z(W^{(i)}) \le P_{err} \le \Sigma_{i \in \mathcal{A}} Z(W^{(i)})$$ [Equation 8]

But, $\mathcal{A}$ is a set of bit channels to which information is transmitted.

In a communication system, not only transmission of data to a receiver without any error, but also prevention of data from being decoded by other users is important. The data transmission security has been using various kinds of secret keys based on cryptography dealt with. However, security based on cryptography is based on the assumption that people who wants to illegally decode data lack in the ability of calculation. Thus, if a person with a great ability of calculation tries to decode the data, the data may not be transmitted safely. In addition, for security based on cryptography, a secret key needs to be generated, distributed, and managed, but the whole process may be complicated or difficult depending on a system. For example, management of a secret key may be difficult in various kinds of wireless ad hoc network. To solve these problems, security at the physical layer has been studied as an effort for achieving security communications At the physical layer security, a secret key is not used, and instead various physical layer technologies based on an information theory, a communication theory, and a signal processing theory are used for security. Among them, the recent technology is a method of realizing security using a polar code at the physical layer. First of all, Alice is defined as an information transmitter, Bob is defined as a target receiver (or a legal information receiver), and Eve is defined as an eavesdropper (or an illegal information receiver).

FIG. 1 shows an existing polar code.

Referring the FIG. 1, security communication uses a polar code at the physical layer. A channel to Bob is good, so more number of bit channels to Bob is good. Thus, there are three types of bit channels: bit channels which are good for both of Bob and Eve, bit channels which are good for Bob but bad for Eve, and bit channels which are bad for both of Bob and eve. Random bits 300 are transmitted to the first bit channel set, actual information bits 200 are transmitted to the second bit channel set, and frozen bits 100 are transmitted to the third bit channel set. In this case, Bob can decode the received information bits 200, but Even can't.

The transmission method based on polar codes, which is shown in FIG. 1, has two problems. The first problem is that even though there are many bit channels good for Bob, if the number of the bit channels good for Bob is close to the number of bit channels good for Eve, the number of bit channels which is actually able to transmit information may be very few. The second problem is that even though FIG. 1 is based on assumption in which a code length n is infinitely long, the code length n is any finite value in the real world. As such, if a code length is finite, a code cannot be separate simply into a good bit channel set not having errors and a bad bit channel set always having errors, as shown in Equation (5) and (6). That is, if a code length is finite, there may be many bit channels belonging neither to the bit channel set not having errors nor to the bit channel set always having errors, and a polar code should be constructed in consideration of such bit channels. In the present invention, the bit channels are called gray bit channels.

SUMMARY OF THE INVENTION

The present disclosure aims to propose a method for addressing the above issues.

In an aspect, a method for providing a secure transmission based on a polar code is provided. The method comprises generating an output bit sequence by applying a polar code generator matrix to an input bit sequence, and transmitting the output bit sequence to a target receiver. The input bit sequence includes first information bits, second information bits and third information bits. The first information bits correspond to gray bit channels for the target receiver and bad bit channels for an eavesdropper. The third information bits correspond to good bit channels for the target receiver and gray bit channels for the eavesdropper.

The input bit sequence may further include frozen bits corresponding to bad bit channels for the target receiver and bad bit channels for the eavesdropper.

The second information bits may correspond to good bit channels for the target receiver and bad bit channels for the eavesdropper.

The input bit sequence may further include random bits corresponding to good bit channels for the target receiver and good bit channels for the eavesdropper.

The good bit channels, the gray bit channels and the bad bit channels may be determined based on mutual information obtained from relationships between the input bit sequence and the output bit sequence.

In another aspect, a device for providing a secure transmission based on a polar code is provided. The device comprises a transceiver configured to transmit and receive radio signals, and a processor operatively coupled with the transceiver. Th processor is configured to generate an output bit sequence by applying a polar code generator matrix to an input bit sequence, and control the transceiver to transmit the output bit sequence to a target receiver. The input bit sequence includes first information bits, second information bits and third information bits. The first information bits correspond to gray bit channels for the target receiver and bad bit channels for an eavesdropper. The third information bits correspond to good bit channels for the target receiver and gray bit channels for the eavesdropper.

Information bits can securely be transmitted from Alice to Bob while increasing the amount of the information bits.

DESCRIPTION OF EXEMPLARY EMBODIMENTS

The present invention is described in security communication using polar codes for security at the physical layer. That is, it aims to allow information transmitted from Alice to be decoded at Bob without any error but not to be decoded at Eve, while maximizing the amount of the transmitted information.

1. Polar Code With Sustainable Security in Light of Error Probability.

Figure 1:
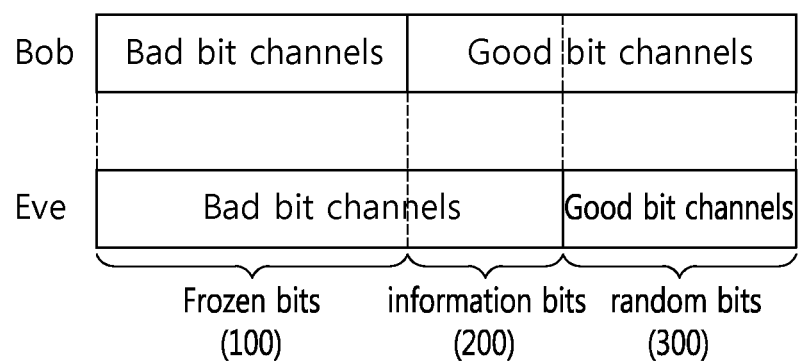
FIG. 1 shows an existing polar code.
Figure 2:
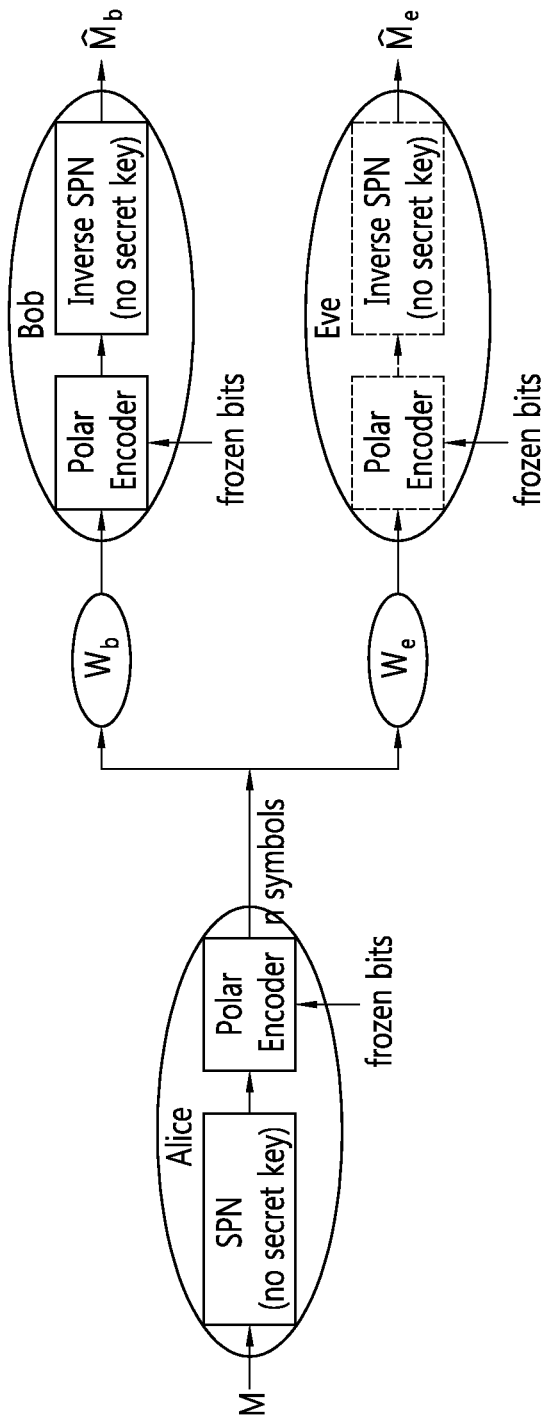
FIG. 2 is a conceptual diagram illustrating secure data transmission.
Figure 3:
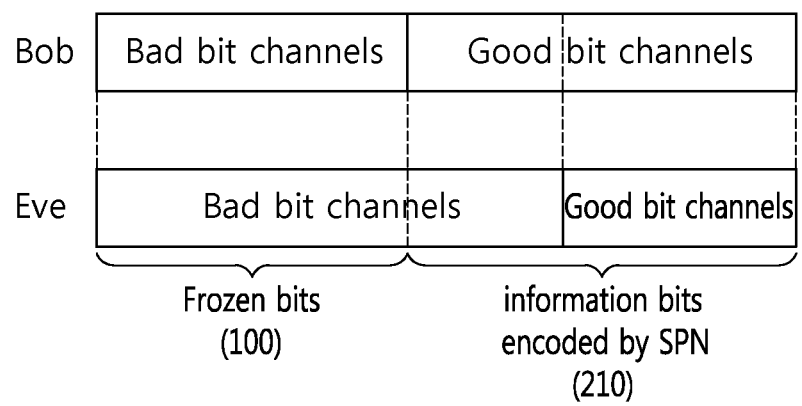
FIG. 3 shows the polar code with an SPN.

FIG. 2 is a conceptual diagram illustrating secure data transmission. And FIG. 3 shows the polar code with an SPN.

Referring to FIG. 2, the polar code uses substitution permutation networks (SPNs). An SPN is a device which is used in existing security communications based on cryptography. If even a single bit error occurs at a receiver of the SPN, every bit at an output may come to have a probability of 50%. The worst bit error probability is 50% (not 100%), and in this case bits in the output is changed randomly. That is, if even a single bit error exists in the receiver of the SPN, an error occurs in every bit in the output of the SPN. This is called an avalanche effect. The existing cryptography uses an SPN along with a secret key to achieve security communications. However, in the present invention, an SPN is used without a secret key only for the purpose of error amplifications. A concept regarding this is shown in FIG. 2.

First of all, consider a case where length n is infinitely (or extremely) long. In this case, a method proposed by the present invention is shown in FIG. 3. In this method, when transmitting information bits 210, Alice uses all the bit channels good for Bob. But, the information bits 210 are encoded by the SPN (which does not use a secret key). The transmitted bits are sent to bit channels good for Bob, so any error does not occur in the bits that Bob receives. Thus, even in the case where Bob uses an SPN, errors are not amplified. On the other hand, as for Eve, some of transmitted bits pass through bit channels bad for Eve, so errors exists in the bits that Eve receives. Thus, errors are amplified in an SPN output of Eve, and a bit error probability for all the output bits is close to 50%.

In the real world, length of a polar code n is finite. In this case, many bit channels may have Z and I values, each of which is 0 or not close to 1, and such bit channels are gray bit channels. To describe them mathematically, they may be classified into good bit channels (almost) not having errors, bad bit channels (almost) always having errors, and gray bit channels between the good bit channels and the bad bit channels.

Figure 4:
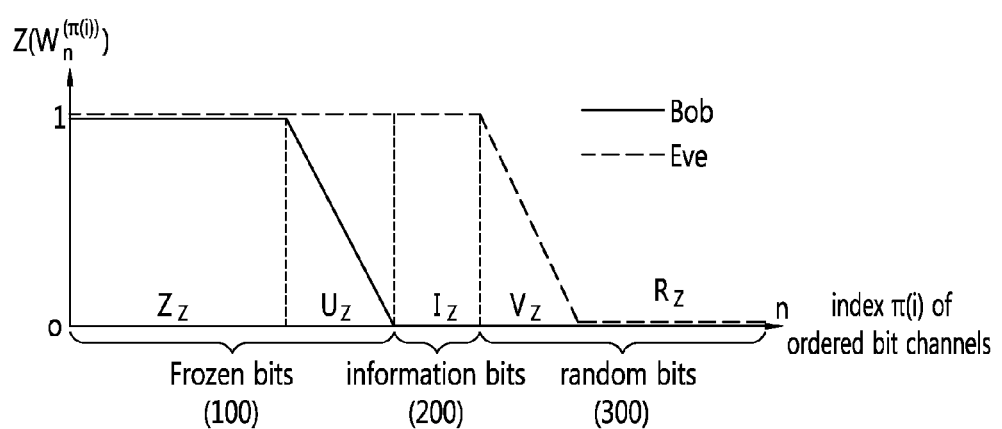
FIG. 4 is an exemplary view illustrating an error probability of the channel for the existing polar code.
Figure 5:
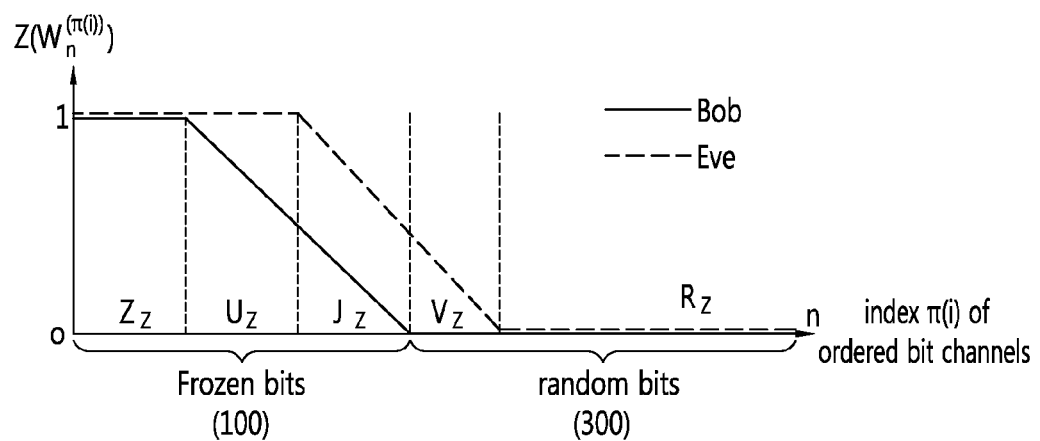
FIG. 5 is another exemplary view illustrating an error probability of the channel for the existing polar code.

FIG. 4 is an exemplary view illustrating an error probability of the channel for the existing polar code. And FIG. 5 is another exemplary view illustrating an error probability of the channel for the existing polar code.

(Definition 1)

Distinction of good bit channels, bad bit channels, and gray bit channels based on errors.

If a Bhattacharyya value of a bit channel $W^{(i)}$ is smaller than $\delta_Z^L$, the bit channel is a good bit channel. A set of good bit channels is represented as below:

$$\mathcal{G}_Z(W) = \{i \in [1,n] : Z(W^{(i)}) \leq \delta_Z^L\} \quad \text{[Equation 9]}$$

If a Bhattacharyya value of a bit channel $W^{(i)}$ is greater than $\delta_Z^U$, the bit channel is a bad bit channel. A set of bad bit channels is represented as below:

$$\mathcal{B}_Z(W) = \{i \in [1,n] : Z(W^{(i)}) \geq \delta_Z^U\} \quad \text{[Equation 10]}$$

If a Bhattacharyya value of a bit channel $W^{(i)}$ is greater than $\delta_Z^L$ but smaller than $\delta_Z^U$, the bit channel is a gray bit channel. A set of gray bit channels is represented as below:

$$\mathcal{Q}_Z(W) = \{i \in [1,n] : \delta_Z^L \leq Z(W^{(i)}) \leq \delta_Z^U\} \quad \text{[Equation 11]}$$

In an actual system, suppose that $W_b$ is given as a channel between Alice and Bob, that $W_c$ is given as a channel between Alice and Eve, and that $W_b$ is better than $W_c$. In this case, the following six types of bit channel sets may be considered.

$$Z_Z = \mathcal{B}_Z(W_b) \cap \mathcal{B}_Z(W_c) \quad \text{[Equation 12]}$$

$$U_Z = \mathcal{Q}_Z(W_b) \cap \mathcal{B}_Z(W_c) \quad \text{[Equation 13]}$$

$$I_Z = \mathcal{G}_Z(W_b) \cap \mathcal{B}_Z(W_c) \quad \text{[Equation 14]}$$

$$J_Z = \mathcal{Q}_Z(W_b) \cap \mathcal{Q}_Z(W_c) \quad \text{[Equation 15]}$$

$$V_Z = \mathcal{G}_Z(W_b) \cap \mathcal{Q}_Z(W_c) \quad \text{[Equation 16]}$$

$$R_Z = \mathcal{G}_Z(W_b) \cap \mathcal{G}_Z(W_c) \quad \text{[Equation 17]}$$

In the above, if $I_Z$ is a null set, $J_Z$ is not a null set. In contrary, if $I_Z$ is not a null set, $J_Z$ is a null set. FIG. 4 illustrates a case where $I_Z$ is not a null set, and FIG. 5 illustrates a case where $I_Z$ is a null set. In the drawings, bit channels are arranged in a direction to which a Bhattacharyya value decreases, and such arrangement is indicated by $\pi(i)$.

If any bit channels for Bob is good bit channels, bits to be transmitted to the bit channels may be decoded at Bob without any error. That is, the bit channels are reliable channel not having errors. If any bit channels for Eve is bad bit channels, bits to be transmitted to the bit channels are not decoded at Eve. That is, the bit channels are safe channels in light of security. Thus, bit channels to which information bits 200 are transmitted should be bit channels good for Bob but bad for Eve. Based on this concept, a very simple transmission method may be given, as shown in FIG. 4. That is, only to bit channels belonging to $I_Z$, information can be transmitted as shown in the following:

Frozen bits 100 are transmitted to bit channels belonging to $Z_Z$

Frozen bits 100 are transmitted to bit channels belonging to $U_Z$

Information bits 200 are transmitted to bit channels belonging to $I_Z$

Random bits 300 are transmitted to bit channels belonging to $V_Z$

Random bits 300 are transmitted to bit channels belonging to $R_Z$

If $I_Z$ is a null set, as shown in FIG. 5, information cannot be transmitted at all. Therefore, as shown in FIG. 4 or FIG. 5, the number of bit channels to which information is actually able to be transmitted may be very limited or none. To solve this problem, there are proposed new transmission methods in the following.

1.1 Method Using SPN

As described above, to solve a problem that a security communication polar code has a limited number of bit channels to which information is actually able to be transmitted, the present invention uses an SPN along with a polar code, as shown in FIG. 2.

Figure 6:
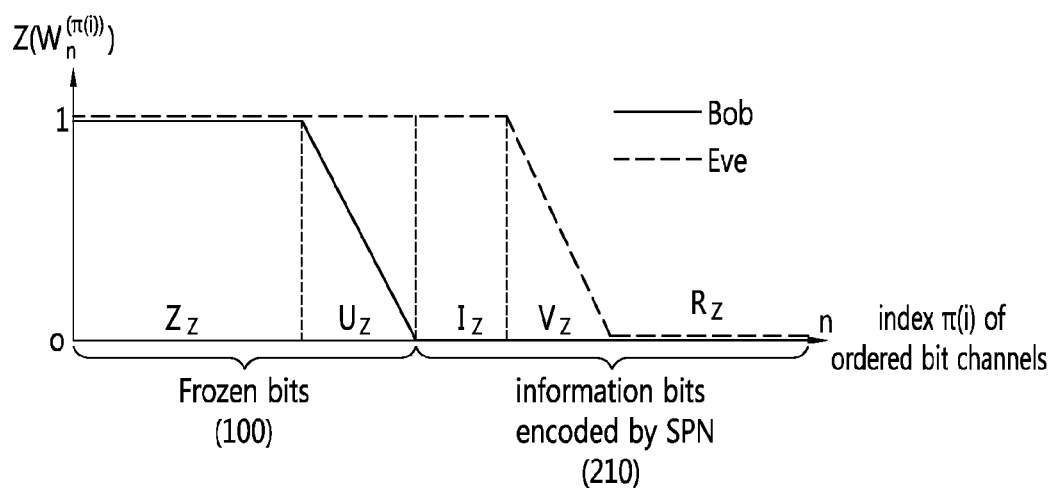
FIG. 6 is an exemplary view illustrating an error probability of the channel for the polar code with the SPN.
Figure 7:
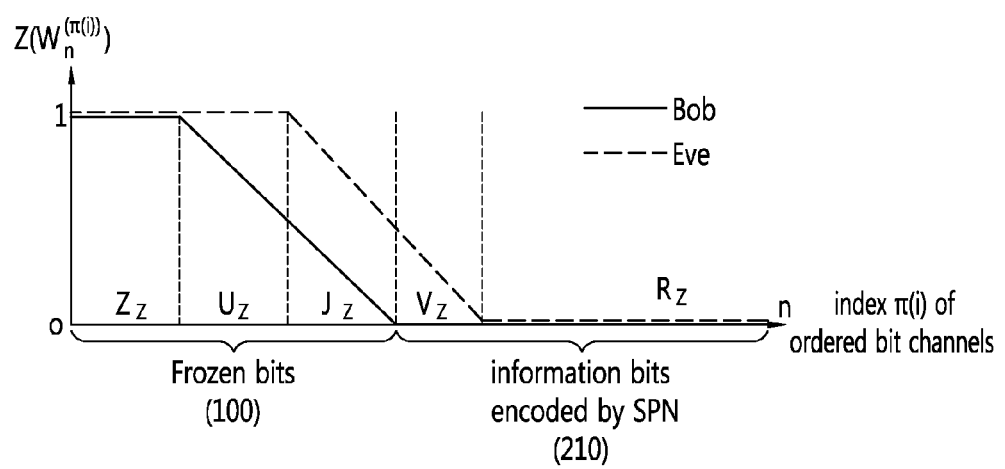
FIG. 7 is another exemplary view illustrating an error probability of the channel for the polar code with the SPN.

FIG. 6 is an exemplary view illustrating an error probability of the channel for the polar code with the SPN. And FIG. 7 is another exemplary view illustrating an error probability of the channel for the polar code with the SPN.

Referring to FIG. 6, information bits 210 are transmitted to bit channels belonging to three sets $I_Z$, $V_Z$, and $R_Z$. In addition, the information bits 210 are decoded at Alice by an SPN and interpreted at Bob by an SPN (a secret key is not used in the two SPN). Bit channels belonging to the three sets $I_Z$, $V_Z$, and $R_Z$ are all good bit channels for Bob. Thus, when data is decoded at bob, any error does not occur. Thus, even in the case of an SPN is used, there is no problem about error amplification. However, all the bit channels belonging to $I_Z$ are bad bit channels for Eve, and even bit channels belonging to $V_Z$ are gray bit channels, which are not good bit channels. Thus, when data is decoded, at least one bit error may occur in such bit channels. In this case, errors are amplified due to an avalanche effect of an SPN, so an output bit error probability becomes 50%. Even if $I_Z$ is a null set, information is transmitted to bit channels belonging to $V_Z$, and $R_Z$ in the proposed method, as shown in FIG. 7.

When data is decoded in a receiver of Eve, bits transmitted to a bit channel belonging to $R_Z$ may be decoded without any error. However, an error always occurs in bits transmitted to bit channels belonging to $I_Z$, and an error may or may not occur in bits transmitted to bit channels belonging to $V_Z$. All the transmitted bits are encoded by an SPN, and if Eve wants to decode even a single bit without an error, it is required to decode all the bits without an error because of the avalanche effect of the SPN. Eve is not able to decode any bit transmitted to bit channels belonging to $I_Z$ Among all the transmitted bits, so security strength of transmitted data is proportional to the number of bits transmitted through $I_Z$, that is, $|I_Z|$. Security of transmitted data is great if $|I_Z|$ is great enough, but it is low if $|I_Z|$ is very small. In conclusion, bits transmitted to bit channels belonging to $I_Z$ act as secret keys. For example, Advance Encryption Standard (AES), which is the most typical method in existing cryptography, provides three secret keys, such as 128 bit, 196 bit, and 256 bit. It is known that in most cases a 128-bit secret key is good enough for security of transmitted data. In this point of view, if $|I_Z| \geq 128$, security of data to be transmitted using an SPN and a polar code proposed in the present invention is high enough. In contrary, if $|I_Z|<128$, security of data to be transmitted may not high enough.

1.2 Method of Allocating Dynamic Frozen Bits

An existing polar code use certain bit values agreed between Alice and Bob as a frozen bit. In the case of symmetric channels, 0 may be transmitted as the frozen bit. As such, if a frozen bit is fixed, it is appropriate to see that Eve is informed of values for the frozen bit.

Figure 8:
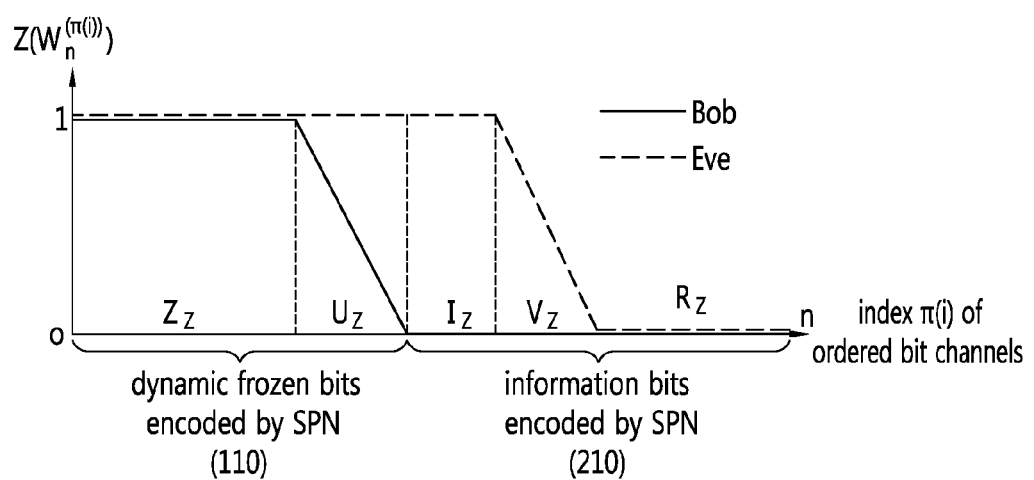
FIG. 8 is an exemplary view illustrating an error probability of the channel for the polar code with the SPN and dynamic frozen bits.

FIG. 8 is an exemplary view illustrating an error probability of the channel for the polar code with the SPN and dynamic frozen bits.

In order to enhance security of communications, the present invention proposes a method of updating a frozen bit 110 in every polar code frame or polar code codeword. That is, as frozen bits 110 of a polar code in the current frame, information bits 210 within a past polar code frame decoded by Bob without any error are used. In particular, to guarantee information bits 210 that were perfectly decoded by Bob without any error, CRC may be used at Alice to transmit information bits (such past information bits could not be decoded by Eve without any error). When transmitting data, Alice uses an SPN to decode both of frozen bits 110 and information bits 210. Frozen bits 110 at Bob's point of view are bits which have been decoded without any error, and all information bits 210 are bit channels for Bob, so that any decoding error does not occur and thus any error amplification by an SPN does not occur. However, at Eve's point of view, errors occur not only in information bits 210, but also frozen bits 110. In particular because all frozen bits 110 are transmitted to bit channels bad for Eve, errors always occur at Eve when the frozen bits 110 are decoded. In conclusion, Due to error amplification by an SPN, an error probability for an output bit at Eve is close to 50%. This kind of transmission method is shown in FIG. 8.

1.3 Method of Adding Another Channel Code to a Polar Code

To improve performance of a security communication polar code, another channel code may be added to the polar code. In the present invention, a Maximum Distance Separable (MDS) code is considered. A typical example of the MDS code is a Read Solomon (RS) code.

Figure 9A:
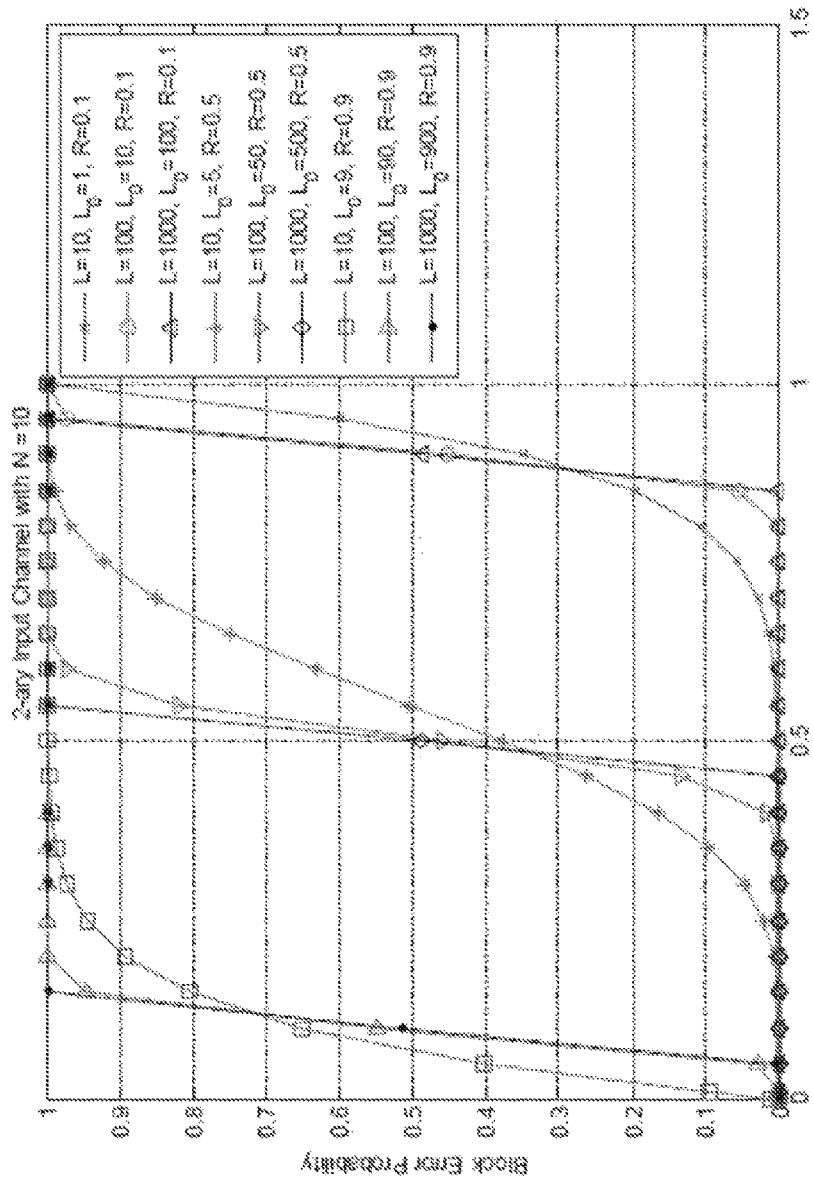
FIGS. 9A and 9B shows error probabilities of MDS codes.
Figure 9B:
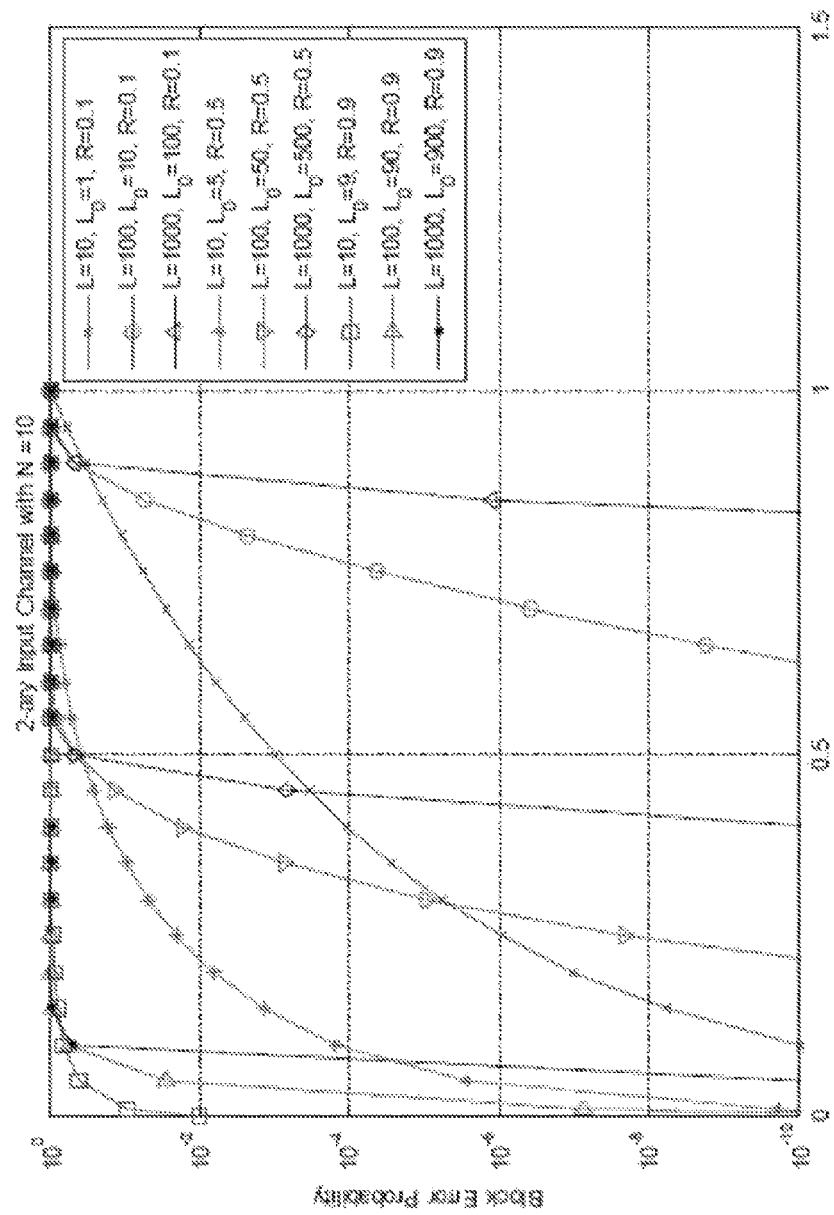

FIGS. 9A and 9B shows error probabilities of MDS codes.

When the MDS code is used in a wireless fading environment, it maximizes a diversity gain. It means that the slope of a decoding error probability curve obtained with respect to a signal to noise ratio or a channel error probability becomes maximized. Performance of an MES code regarding a Binary Erasure Channel (BEC) is shown in FIGS. 9A and 9B. A left drawing shows a decoding error probability in light of log scale. In the drawing, $\epsilon$ denotes an erasure probability of a BEC, L denotes length of an MDS code, $L_0$ denotes the number of information symbols transmitted in a single codeword of the MDS code, and each symbol of the MDS code is defined in GF(N). Therefore, a code rate of a given MDS code is given as $R=L_0/L$.

If the erasure probability $\epsilon$ is fixed and a code rate decreases, even a decoding error probability also decreases. Meanwhile, if a code rate R is fixed and a code length L increases, the slope of a decoding error curve keeps increasing to be almost vertical. In this case, error curves corresponding different code lengths L but having the same code rate R approximately crosses the same point. A erasure probability corresponding to the point is represented by $\epsilon_{TH}$. The erasure probability $\epsilon_{TH}$ is changed depending on a code rate. That is, by adjusting the code rate properly, it is possible to adjust a value of $\epsilon_{TH}$. If the actual erasure probability $\epsilon$ is smaller than $\epsilon_{TH}$ ($\epsilon<\epsilon_{TH}$), a decoding error probability improves as the code length L increases. On the other hand, if the actual erasure probability $\epsilon$ is greater than $\epsilon_{TH}$ ($\epsilon>\epsilon_{TH}$), a decoding error probability becomes worse as the code length L increases. That is, even though a single MDS code is used, the decoding error probability may become better or worse according to an actual erasure probability. In particular, to make the difference great, the code length L needs to be increased. This concept may be adapted not only in a BEC, but also any other channels.

Figure 10:
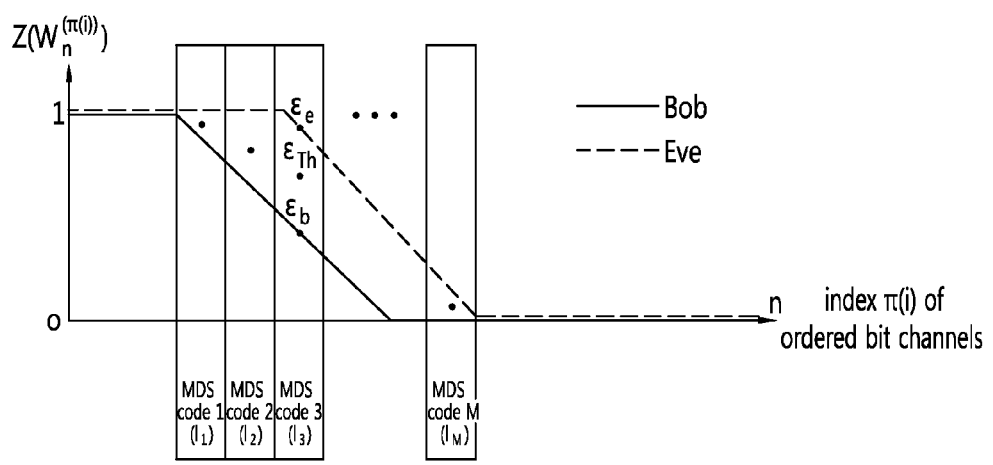
FIG. 10 is an exemplary view illustrating the MDS codes used for gray bit channels.

FIG. 10 is an exemplary view illustrating the MDS codes used for gray bit channels. And FIG. 11 is an exemplary view illustrating an error probability of the channel for the polar code with the MDS codes.

Using the aforementioned properties of an MDS code, a decoding error probability for Bob is reduced further while a decoding error probability for Eve is increased further. It is assumed that $\epsilon_b$ is an erasure probability for Bob and $\epsilon_e$ is an erasure probability for Eve. In the present invention, bit channels of a polar code are classified into a plurality of sets and an MDS code having a different code rate for each set. In particular, when a code rate of an MDS used for each bit channel set, $\epsilon_{TH}$ of the MDS code should be greater than $\epsilon_b$ but smaller than $\epsilon_e$. That is, an MDS code rate is adjusted to satisfy $\epsilon_b < \epsilon_{TH} < \oplus_e$ and be located approximately in the middle of $\epsilon_b$ and $\epsilon_e$. This concept is shown in FIG. 10. By using the MDS code in the above manner, it is possible to further reduce a decoding error probability for Bob and further increase a decoding error probability for Eve, and a transmission method based on this concept is shown in FIG. 11.

Figure 11:
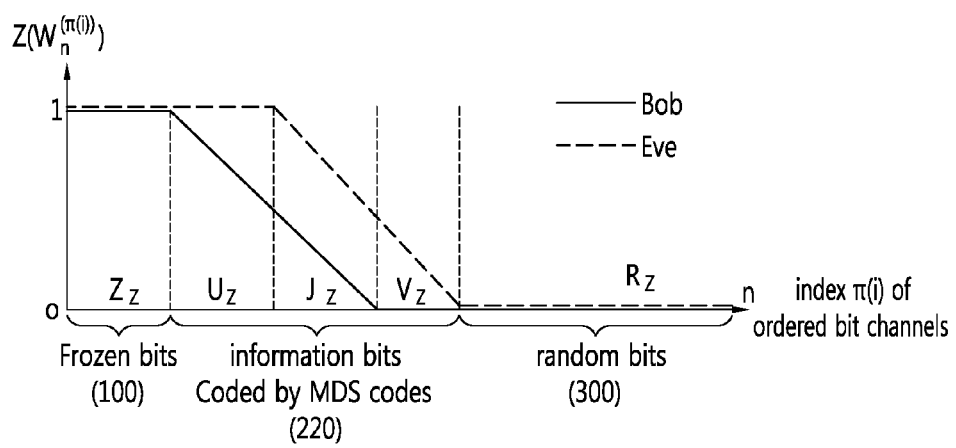
FIG. 11 is an exemplary view illustrating an error probability of the channel for the polar code with the MDS codes.

The transmission method proposed in FIGS. 10 and 11 may be realized using not only an MDS code, but also any of various other channel codes. For example, a turbo code, an LDPC doe, and any other channel code may be used. In addition, the same method may be used even when a given channel is a channel other than a binary erasure channel.

1.4 Method of Combining Various Methods

Figure 12:
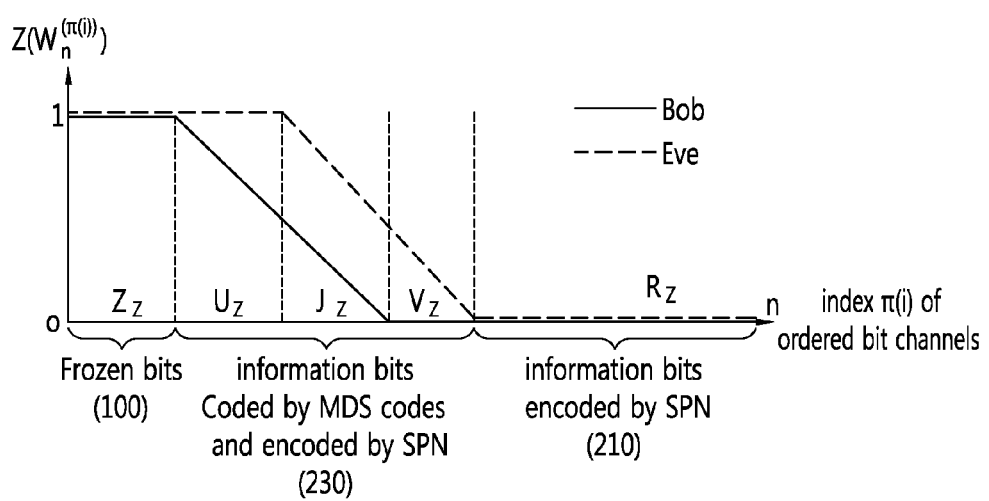
FIG. 12 is an exemplary view illustrating an error probability of the channel for the polar code with the MDS codes and the SPN.
Figure 13:
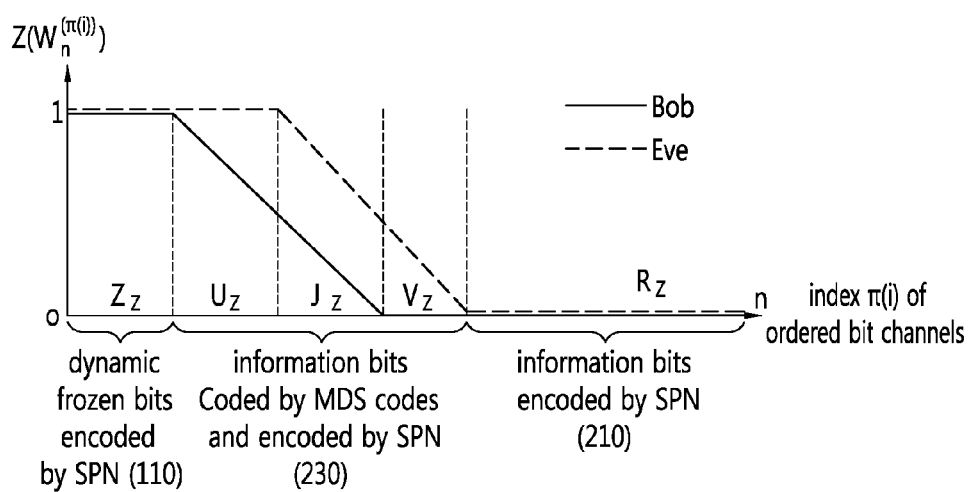
FIG. 13 is an exemplary view illustrating an error probability of the channel for the polar code with the MDS codes, the SPN and the dynamic frozen bits.

FIG. 12 is an exemplary view illustrating an error probability of the channel for the polar code with the MDS codes and the SPN. And FIG. 13 is an exemplary view illustrating an error probability of the channel for the polar code with the MDS codes, the SPN and the dynamic frozen bits.

To maximize performance of a security communication polar code, the various methods proposed above may be used in combination. For example, data transmission is possible by using both of an SPN and an MDS code, and this concept is shown in FIG. 12. In addition, data transmission is possible by using an SPN, dynamic frozen bits, and an MDS code, and this concept is shown in FIG. 13.

2. Polar Code With Sustainable Security in Light of Mutual Information

In the previous chapter, various polar coding methods have been proposed with communication reliability and security which are defined in light of a decoding error probability. In this chapter, communication reliability and security are defined regarding mutual information, and a polar coding method with performance improved in this regard is proposed. The mutual information is measured by amount of information that can be obtained about one random variable by observing another. That is, the mutual information is obtained from relationship between the input information and polar code.

Figure 14:
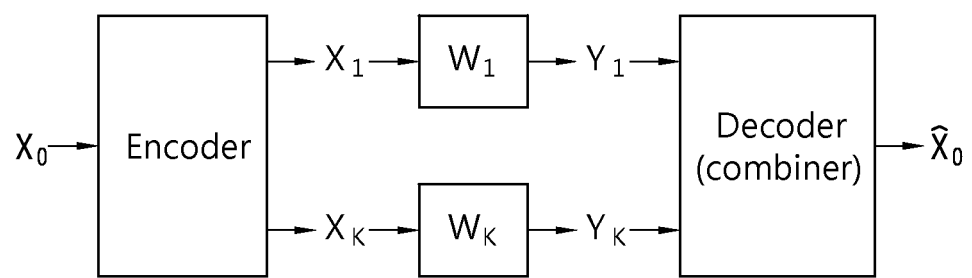
FIG. 14 is conceptual diagram illustrating the information combination.

FIG. 14 is conceptual diagram illustrating the information combination.

Referring to FIG. 14, a method to be added to a polar coding is information combining.

An information combining methods are repetition coding and single parity check coding. In the present invention, REF coding refers to repetition coding, and SPC coding refers to single parity check coding.

First, REP coding is implemented as below. Suppose that $X_0 \in \{0,1\}$ is a binary symbol to be transmitted. In REP coding, $X_1, X_2, \ldots, X_K \in \{0,1\}$, which are K number of binary symbols and satisfy the following condition, are transmitted:

$$X_0 = X_1 = \ldots = X_K \quad \text{[Equation 18]}$$

Here, K number of symbols $X_1, X_2, \ldots, X_K$ is transmitted to binary input channels $W_1, W_2, \ldots, W_K$ which are independent of each other. In the present invention, such REP coding is represented by $\mathbb{C}_{rep}(W)$. But, $W = \{W_1, \ldots, W_K\}$. Symbols received at a receiver are represented as below:

$$Y = [Y_1, Y_2, \ldots, Y_K] = [W_1(X_1), W_2(X_2), \ldots, W_K(X_K)] \quad \text{[Equation 19]}$$

In this case, mutual information is given as below:

$$I(\mathbb{C}_{rep}(W)) = I(X_0; Y) \quad \text{[Equation 20]}$$

When the optimal decoding is implemented at a receiver, it is possible to obtain accurate values of $I(\mathbb{C}_{rep}(W_{BSC}))I(\mathbb{C}_{rep}(W_{BEC}))$. But, $W_{BSC}$ indicates that K number of channels is all binary symmetric channels (BSCs), and $W_{BEC}$ indicates that K number of channels is all binary erasure channels (BECs). Regarding a general binary input channel W, the following relationship may be proved:

$$I(\mathbb{C}_{rep}(W_{BSC})) \leq I(\mathbb{C}_{rep}(W)) \leq I(\mathbb{C}_{rep}(W_{BEC})) \quad \text{[Equation 21]}$$

Second, SPC coding is implemented as below. Suppose that $X_0 \in \{0,1\}$ is a binary symbol to be transmitted. In SPC coding, $X_1, X_2, \ldots, X_K \in \{0,1\}$, which are K number of binary symbols and satisfy the following condition, are transmitted:

$$X_0 \oplus X_1 \oplus X_2 \oplus \ldots \oplus X_K = 0 \quad \text{[Equation 22]}$$

Here, K number of symbols $X_1, X_2, \ldots, X_K$ is transmitted to binary input channels $W_1, W_2, \ldots, W_K$ which are independent of one another. In the present invention, such SPC coding is represented by $\mathcal{E}_{spc}(W)$. But, $W = \{W_1, \ldots, W_K\}$. Symbols received by a receiver are represented as below:

$$Y = [Y_1, Y_2, \ldots, Y_K] = [W_1(X_1), W_2(X_2), \ldots, W_K(X_K)] \quad \text{[Equation 23]}$$

In this case, mutual information is given as below:

$$I(\mathbb{C}_{rep}(W)) = I(X_0; Y) \quad \text{[Equation 24]}$$

When the optimal decoding is implemented at a receiver, it is possible to obtain accurate values of $I(\mathbb{C}_{spc}(W_{BSC}))I(\mathbb{C}_{spc}(W_{BEC}))$. Regarding a general binary input channel W, the following relationship may be proved:

$$I(\mathbb{C}_{spc}(W_{BEC})) \leq I(\mathbb{C}_{rep}(W)) \leq I(\mathbb{C}_{spc}(W_{BSC})) \quad \text{[Equation 25]}$$

The method proposed in the present invention are able to be applied not only to a binary symmetric channel and a binary erasure channel, but also any kind of binary input channels, so that in the real world an upper bound and a lower bound may be used as below. In particular, to guarantee decoding reliability at Bob and security at Eve in any case, a lower bound may be always used for Bob and an upper bound may be always used for Eve.

Bob:
Regarding REF coding, a lower bound $I(\mathbb{C}_{rep}(W_{BSC}))$ is used
Regarding SPC coding, a lower bound $I(\mathbb{C}_{spc}(W_{BEC}))$ is used Eve:
Regarding REP coding, an upper bound $I(\mathbb{C}_{rep}(W_{BEC}))$ is used
Regarding SPC coding, a lower bound $I(\mathbb{C}_{spc}(W_{BSC}))$ is used In a case where REP coding or SPC coding is used in the polar coding method proposed in the present invention, various bit channels combined by the coding methods may not be independent, but dependent. However, if length of a code is not too short, dependence of bit channels of a polar code is not great and it may be reduced as the length of the code increases. Thus, the bit channels may be used with ignoring dependence thereof.

2.1 Polar Code to Which Information Combination Coding Has Been Added

In this chapter, a good bit channel, a bad bit channel, and a gray bit channel are distinguished based on mutual information.

Figure 15:
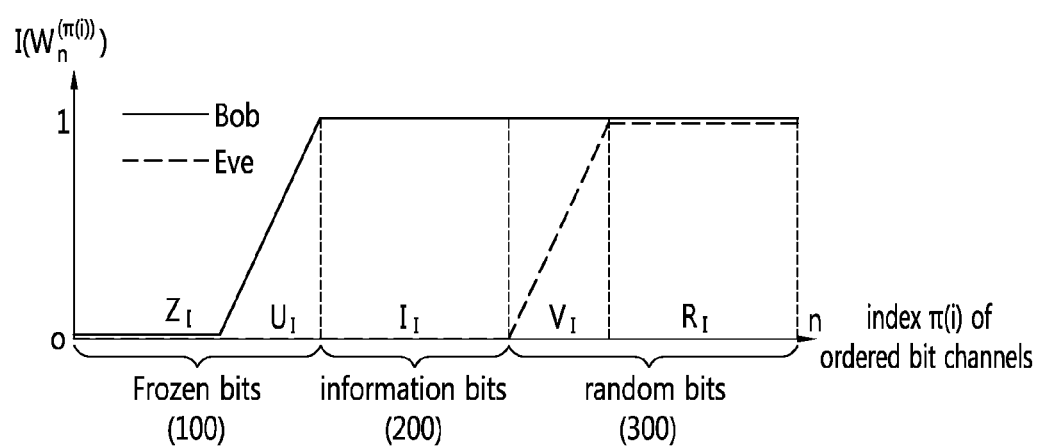
FIG. 15 is an exemplary view illustrating the mutual information of the channel for the existing polar code.

FIG. 15 is an exemplary view illustrating the mutual information of the channel for the existing polar code.

(Definition 2)

Distinction of a good bit channel, a bad bit channel, a gray bit channel based on mutual information If mutual information of a bit channel $W^{(i)}$ is greater than $\delta_I^U$, the bit channel is a good bit channel, A set of good bit channels is represented as below.

$$\mathcal{G}_I(W) = \{i \in [1,n] : I(W^{(i)}) \geq \delta_I^U\} \quad \text{[Equation 26]}$$

If mutual information of a bit channel $W^{(i)}$ is smaller than $\delta_I^L$, the bit channel is a bad bit channel, A set of bad bit channels is represented as below.

$$\mathcal{B}_I(W) = \{i \in [1,n] : I(W^{(i)}) \geq \delta_I^L\} \quad \text{[Equation 27]}$$

If mutual information of a bit channel $W^{(i)}$ is greater than $\delta_I^L$ but smaller than $\delta_I^U$, the bit channel is a gray bit channel, A set of gray bit channels is represented as below.

$$\mathcal{Q}_I(W) = \{i \in [1,n] : \delta_I^L < I(W^{(i)}) < \delta_I^U\} \quad \text{[Equation 28]}$$

Based on the above definition, six types of bit channel sets may be considered as below:

$$Z_I = \mathcal{B}_I(W_b) \cap \mathcal{B}_I(W_e) \quad \text{[Equation 29]}$$

$$U_I = \mathcal{Q}_I(W_b) \cap \mathcal{B}_I(W_e) \quad \text{[Equation 30]}$$

$$I_I = \mathcal{G}_I(W_b) \cap \mathcal{B}_I(W_e) \quad \text{[Equation 31]}$$

$$J_I = \mathcal{Q}_I(W_b) \cap \mathcal{Q}_I(W_e) \quad \text{[Equation 32]}$$

$$V_I = \mathcal{G}_I(W_b) \cap \mathcal{Q}_I(W_e) \quad \text{[Equation 33]}$$

$$R_I = \mathcal{G}_I(W_b) \cap \mathcal{G}_I(W_e) \quad \text{[Equation 34]}$$

In the above, $J_I$ is not a null set if $I_I$ is a null set, and $J_I$ is a null set if $I_I$ is not a null set. In the following, there is proposed a polar coding method with improved performance in a case where $I_I$ is not a null set and $J_I$ is a null set. A similar method may be proposed even in a case where $I_I$ is a null set and $J_I$ is not a null set.

Similar to the previous chapter, as a very simple transmission method, a transmission method shown in FIG. 15 may be considered. That is, in this case, information is to be transmitted only to bit channels belonging to $I_I$, as shown in the following:

Frozen bits 100 are transmitted to bit channels belonging to $Z_I$

Frozen bits 100 are transmitted to bit channels belonging to $U_I$

Information bits 200 are transmitted to bit channels belonging to $I_I$

Random bits 300 are transmitted to bit channels belonging to $V_I$

Random bits 300 are transmitted to bit channels belonging to $R_I$

Figure 16:
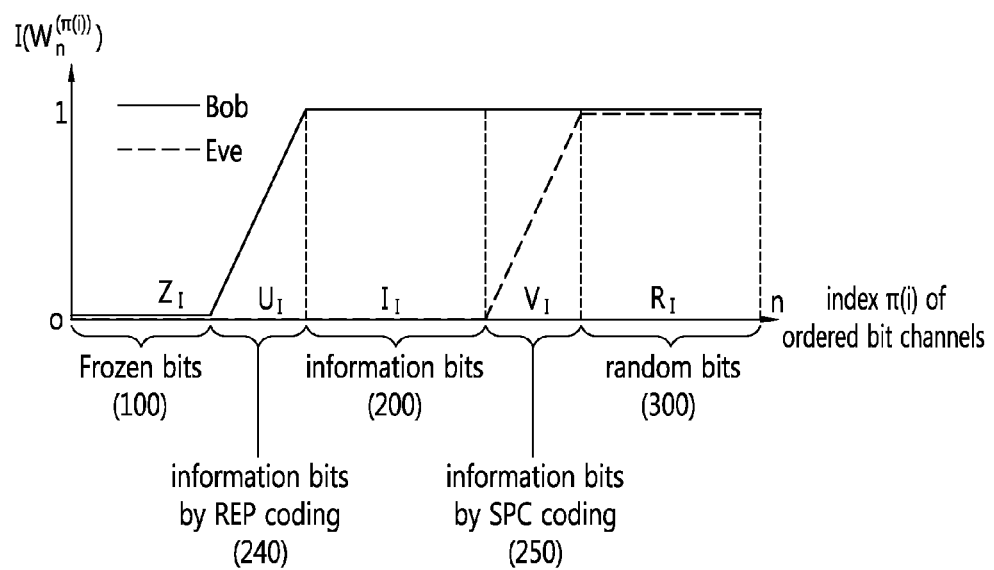
FIG. 16 is an exemplary view illustrating the mutual information of the channel for the polar code with an REP code and an SPC code.

FIG. 16 is an exemplary view illustrating the mutual information of the channel for the polar code with an REP code and an SPC code.

In contrary to the existing method, the method proposed in the present invention uses REP coding for bit channels belonging to $U_I$ and SPC coding for bit channels belonging to $V_I$, as shown in the following:

Frozen bits 100 are transmitted to bit channels belonging to $Z_I$

Information bits 240 are transmitted using REP coding to bit channels belonging to $U_I$ Information bits 200 are transmitted to bit channels belonging to $I_I$ Information bits 250 are transmitted using SPC coding to bit channels belonging to $V_I$ Random bits 300 are transmitted to bit channels belonging to $R_I$ In the drawings, bit channels are arranged in a direction to which the amount of mutual information increases, and such arrangement is indicated by $\pi(i)$.

2.2 Optimal REP Coding Method and Optimal SPC Coding Method

There is proposed an optimal REP coding method and an optimal SPC coding method to maximize a transmission rate of a polar code for security transmission.

Figure 17:
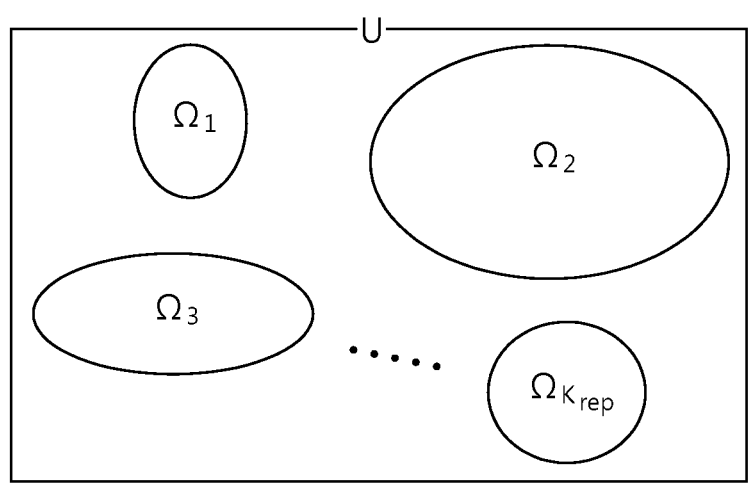
FIG. 17 is an exemplary view a bit channel set $\Omega_m$

FIG. 17 is an exemplary view a bit channel set $\Omega_m$

First, the optimal REP coding method is described. To this end, $W_b^{\Omega_k} = \{W_b^{(i)} : i \in \Omega_k\}$ is used to indicate all the bit channels of Bob belonging to a bit channel set $\Omega_k$. In addition, $W_e^{\Omega_k} = \{W_e^{(i)} : i \in \Omega_k\}$ is used to indicate all the bit channels of Eve belonging to $\Omega_k$. Here, bit channel sets $\Omega_k$, k=1, ..., $K_{rep}$ are different from each other, and subsets belonging to $U_I$ which is defined in the above. The method proposed in the present invention transmits one-bit information using a REP coding method to $|\Omega_k|$ number of bit channels belonging to each bit channel set $\Omega_k \in U_I$, k=1, ..., $k_{rep}$. In conclusion, information bits 240 corresponding to $K_{rep}$ which is the number of bit channel sets may be further transmitted using the REP coding method. Frozen bits 100, that is 0, are transmitted to bit channels belonging to $U_1 \setminus \cup_{k=1}^{K_{rep}} \Omega_k$ which indicates the rest of $U_I$ except $\cup_{k=1}^{K_{rep}} \Omega_k$. To optimally obtain $K_{rep}$ number of bit channel sets $\{\Omega_k : k=1, \ldots, K_{rep}\}$ for implementing the REP coding method, optimization may be done as below.

(Method 1: REP coding I)

$$\max_{\Omega_1, \ldots, \Omega_{K_{rep}}} K_{rep}$$

subject to $I(\mathcal{C}_{spc}(W_b^{\Omega_k})) \geq \delta_I^U, k = 1, 2, \ldots, K_{rep}$ $I(\mathcal{C}_{spc}(W_e^{\Omega_k})) \leq \delta_I^L, k = 1, 2, \ldots, K_{rep}$ $\Omega_k \subseteq U_I, k = 1, 2, \ldots, K_{rep}$ $\Omega_{k_1} \cap \Omega_{k_2} = 0, k_1 \neq k_2$ Now, consider the optimal SPC coding method. To this end, $W_b^{\Theta_k} = \{W_b^{(i)} : i \in \Theta_k\}$ is used to indicate all the bit channels of Bob belonging to a bit channel set $\theta_k$. In addition, $W_e^{\Theta_k} = \{W_e^{(i)} : i \in \Theta_k\}$ is used to indicate all the bit channels of Eve belonging to $\Theta_k$. Here, bit channel sets $\theta_k$, k=1, ..., $K_{spc}$ are different from each other, and subsets belonging to $V_I$ which is defined in the above chapter. The method proposed in the present invention transmits one-bit information using a SPC coding method to $|\Theta_k|$ number of bit channels belonging to each bit channel set $\Theta_k \in V_I$, k=1, ..., $K_{spc}$. In conclusion, information bits 250 corresponding to $K_{spc}$ which is the number of bit channel sets may be further transmitted using the SPC coding method. Random bits 300 are transmitted to bit channels belonging to $V_I \setminus \cup_{k=1}^{K_{spc}} \Theta_k$ which indicates the rest of $U_I$ except $\cup_{k=1}^{K_{spc}} \Theta_k$. To optimally obtain $K_{spc}$ number of bit channel sets $\{\Theta_k : k=1, \ldots, K_{spc}\}$ for implementing the SPC coding method, optimization may be done as below.

(Method 2: SPC coding I)

$$\max_{\Theta_1, \ldots, \Theta_{K_{spc}}} K_{spc}$$

subject to $I(\mathbb{C}_{spc}(W_b^{\Theta_k})) \geq \delta_I^U, k = 1, 2, \ldots, K_{spc}$ $I(\mathbb{C}_{spc}(W_e^{\Theta_k})) \leq \delta_I^L, k = 1, 2, \ldots, K_{spc}$ $\Theta_k \subseteq V, k = 1, 2, \ldots, K_{spc}$ $\Theta_{k_1} \cap \Theta_{k_2} = 0, k_1 \neq k_2$

2.3 REP Coding Method With Reduced Complexity and SPC Coding Method With Reduced Complexity Method 1 and Method 2 proposed in the above may maximize the number of bits capable of being further transmitted by REP coding and SPC coding, but may be complicated while such optimization is done. In this chapter, there is proposed simple REP coding and SPC coding methods which are less complicated.

Figure 18:
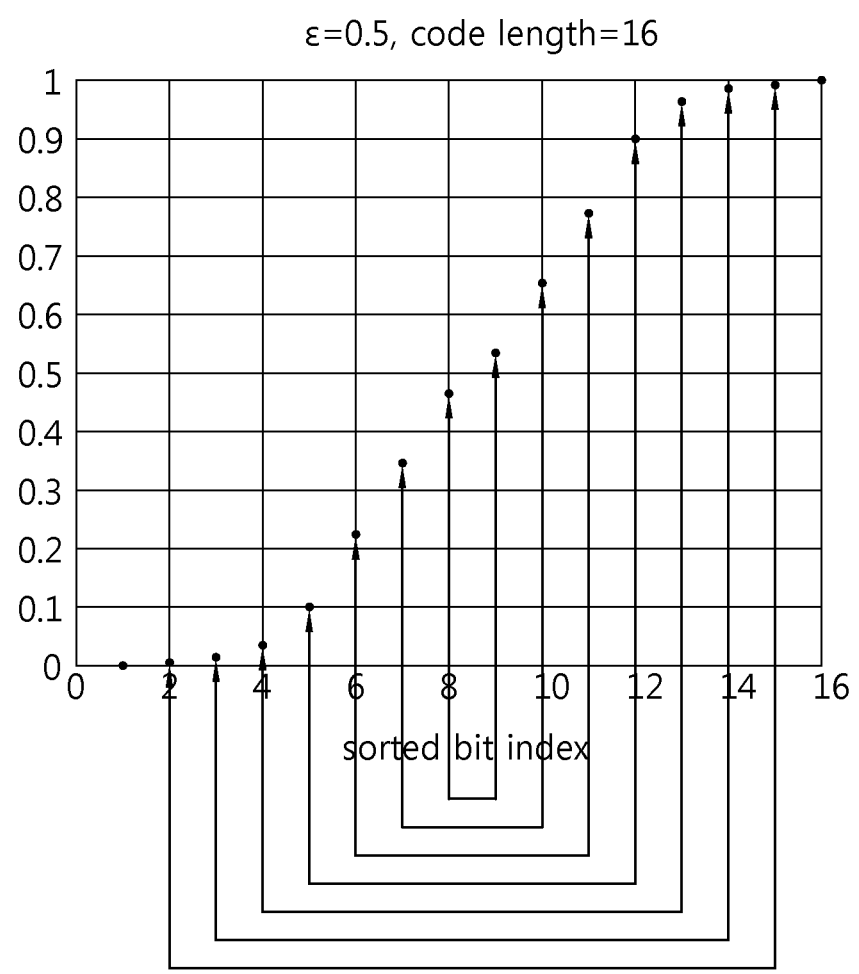
FIG. 18 is an exemplary view REP coding.

FIG. 18 is an exemplary view REP coding.

First, define a pair of bit channels of Bob and a pair of bit channels of Eve as below: $W_b^{(i,j)} = (W_b^{(i)}, W_b^{(j)})$ and $W_e^{(i,j)} = (W_e^{(i)}, W_e^{(j)})$. The basic idea of a proposed algorithm is select a pair of a bit channel having a small amount of mutual information and a bit channel having a great amount of mutual information and then perform REP coding and SPC coding with respect to the two bit channels.

To perform REP coding, various pairs of bit channels belonging to a bit channel set $U_I$ may be obtained, as shown in the following algorithm.

(Method 3: REP Coding II)

Arrange elements of $U_I$ in an increasing order of the amount of information, and then present a set arranged in this manner as $U_I = \{u_1, \ldots, u_{B_b}\}$

```
ψ_rep ← 0
For p = 1: 1: B_b
    For q = B_b: - 1: p + 1
        If u_q ∉ ψ_rep AND I(ℂ_rep(W_b^{up,uq})) ≥ δ_1^U AND
I(ℂ_rep(W_e^{up,uq})) ≤ δ_1^L
            ψ_rep ← ψ_rep ∪ {u_q}
            break
        End
    End
End
```

To perform SPC coding, various pairs of bit channels belonging to a bit channel set $V_I$ may be obtained, as shown in the following algorithm.

(Method 4: SPC Coding II)

Arrange elements of $V_I$ in an increasing order of the amount of information, and then present a set arranged in this manner as $V_I = \{v_1, \ldots, v_{B_e}\}$

```
ψ_spc ← 0
For p = 1: 1: B_e
    For q = B_e: - 1: p + 1
        If v ∉ ψ_spc AND I(ℂ_spc(W_b^{vp,vq})) ≥ δ_1^U AND
I(ℂ_spc(W_e^{vp,vq})) ≤ δ_1^L
            ψ_spc ← ψ_spc ∪ {v_q}
```
            break
        End
    End
End

2.4 REP Coding Method With Much Reduced Complexity, and SPC Coding Method With Much Reduced Complexity Successive interference cancellation (SIC), whose complexity is low, is used for decoding a polar code. In addition, in a case where REP coding or SPC coding is solely used, complexity requiring to decode the code is very low. However, in the method proposed by the present invention, REP decoding or SPC decoding is used along with SIC. In this case, decoding complexity is higher than that of an existing SIC method. The complexity in this case is similar to that of a case where list decoding is used.

In SIC decoding of a polar code, decoding is not performed in the order of bit channels arranged according to an amount of mutual information. In real SIC decoding, decoding is performed when such arrangement is not made, and, if REP decoding or SPC decoding is further used, complexity may increase exponentially. For example, If REP coding is performed at a receiver, as shown in FIG. 18, SIC decoding and REP decoding needs to be done at the receiver. However, at a worst case, SIC decoding needs to be performed considering bit pairs up to 7 at the same time, and, in this case, complexity may be high.

To reduce such high complexity, the present invention proposes a new method.

Figure 19:
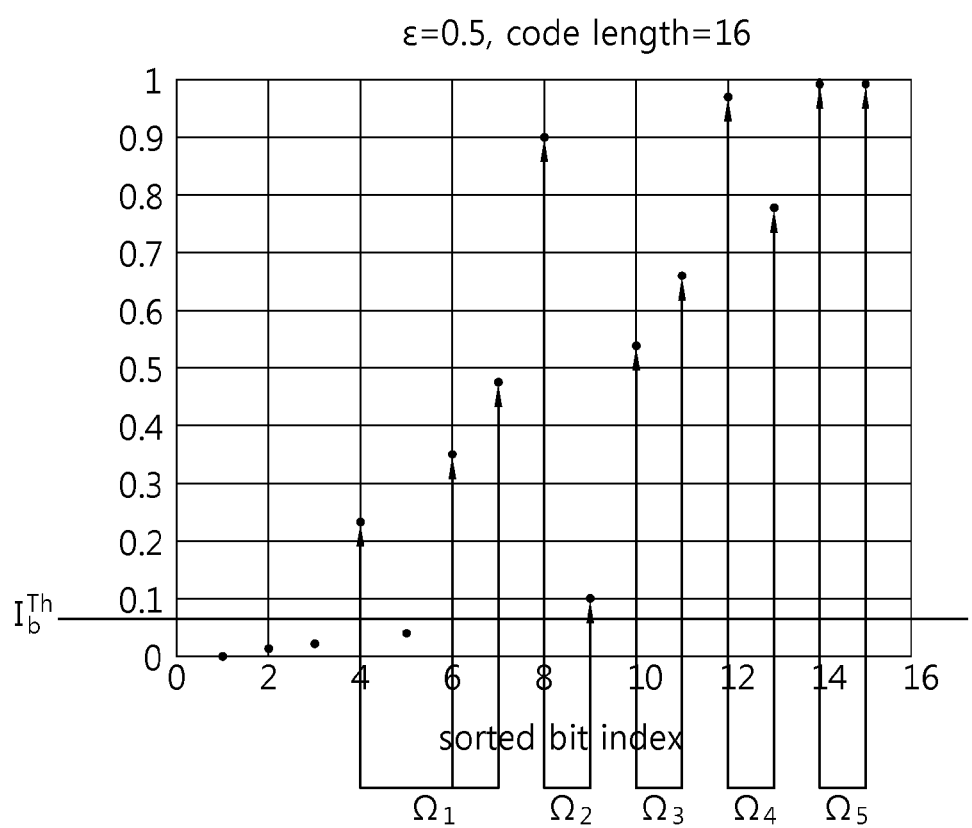
FIG. 19 is another exemplary view REP coding.

FIG. 19 is another exemplary view REP coding.

Referring to FIG. 19, arrange bit channels of $U_I$ and $V_I$ in an order that they are decoded by the SIC method (In the methods 3 and 4, bit channels of $U_I$ and $V_I$ are arranged in an increasing order of the amount of information). Then, exclude Bob's bit channels whose mutual information is smaller than a certain reference value $I_b^{Th}$ and Eve's bit channels whose mutual information is greater than a certain reference value $I_e^{Th}$. Then, determine a bit channel set $\Omega_k$ which performs SPC to transmit one-bit information. Similarly, determine a bit channel set $\Theta_k$ which performs SPC to transmit one-bit information. When determining each of the sets $\Omega_k$ and $\Theta_k$, the determination is made by sequentially searching for bit channels arranged in an order that they are decoded by SIC decoding.

For example, in the case of REP coding, suppose that the first element (bit channel) among bit channels belonging to the set $\Omega_k$ is the k'-th bit channel and the last element (bit channel) is the k''-th bit channel. Then, any element (bit channel) belonging to any other bit channel set $\Omega_m$, $m \neq k$ is not between k' and k''. In this case, even if SIC decoding complexity increases to the utmost due to REP decoding, decoding is performed in consideration of $\max_k |\Omega_k|$ number of bit symbols. The method of determining $\Omega_m$, $m \neq k$ is Method 5, as below.

(Method 5: REP Coding III)

Arrange elements of $U_I$ in a SIC decoding order, and then present a set arranged in this manner as $U_I=\{u_1, \ldots, u_{B_b}\}$ ---
$\Omega_k \leftarrow 0, \forall k$
Set k=1
For p = 1: 1: $B_b$
   If $I(W_b^{up}) \geq I_b^{Th}$ AND $I(W_e^{up}) \leq I_e^{Th}$ AND $I(\mathbb{C}_{rep}\ (W_e^{\Omega k \cup \{vp\}})) \leq \delta_1^L$
      $\Omega_k \leftarrow \Omega_k \cup \{u_p\}$
      If $I(\mathbb{C}_{rep}\ (W_e^{\Omega k})) \geq \delta_1^U$
         k ← k + 1
      End
   End
End
---

Similarly, in the case of SPC coding, suppose that the first element (bit channel) among bit channels belonging to the set $\Theta_k$ is the k'-th bit channel and the last element (bit channel) is the k"-th bit channel. Then, any element (bit channel) belonging to any other bit channel set $\Theta_m$, m≠k is not between k' and k". In this case, even if SIC decoding complexity increases to the utmost due to SPC decoding, decoding is performed in consideration of $\max_k |\Theta_k|$ number of bit symbols.

(Method 6: SPC Coding III)

Arrange elements of $V_I$ in a SIC decoding order, and then present a set arranged in this manner as $V_I=\{v_1, \ldots, v_{B_b}\}$.

---
$\Theta_k \leftarrow 0, \forall k$
Set k=1
For p = 1: 1: $B_e$
   If $I(W_b^{vp}) \geq I_b^{Th}$ AND $I(W_e^{vp}) \leq I_c^{Th}$ AND $I(\mathbb{C}_{rep}\ (W_b^{\Theta k \cup \{vp\}})) \geq \delta_1^U$
      $\Theta_k \leftarrow \Theta_k \cup \{v_p\}$
      If $I(\mathbb{C}_{spc}(W_e^{\Theta k})) \leq \delta_1^L$
         k ← k + 1
      End
   End
End
---

3. Improved Performance of Security Communication Polar Code Due to Channel Depolarization 3.1 Channel Depolarization As described in the previous chapter, the amount of mutual information should be increased for bit channels belonging to U, and decreased for bit channels belonging to $V_I$. To this end, in the previous chapter, REP coding is used for the bit channels belonging to $U_I$, and SPC coding is used for the bit channels belonging to $V_I$.

Figure 20:
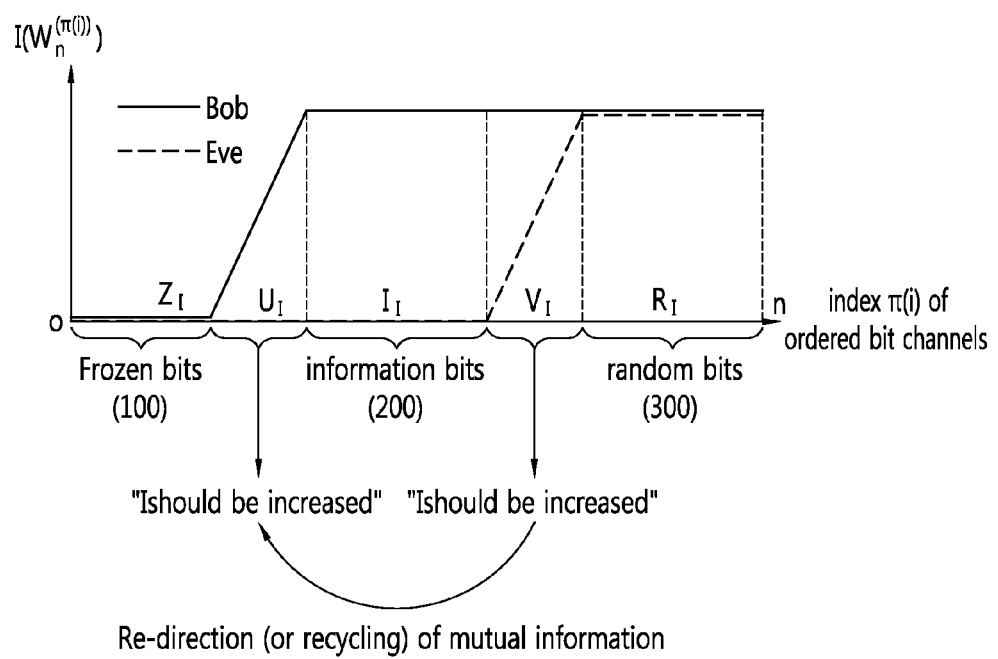
FIG. 20 is an exemplary view a reusing the mutual information.

FIG. 20 is an exemplary view a reusing the mutual information.

Referring to FIG. 20, the more efficient method is transferring mutual information of the bit channels belonging to $V_I$ to the bit channels belonging to $U_I$. By doing so, mutual information of the bit channels belonging to $V_I$ may naturally decrease, while mutual information of the bit channels belonging to $U_I$ may increase.

Figure 21:
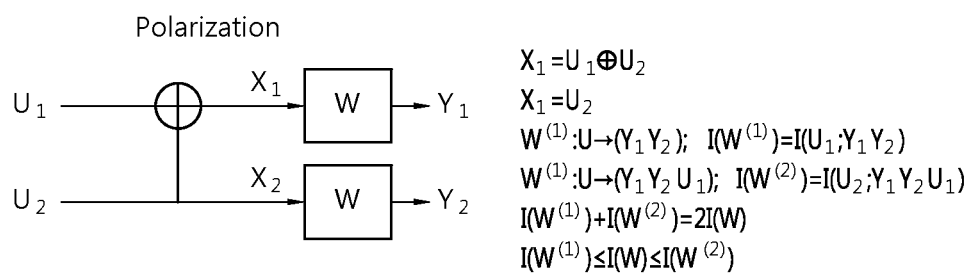
FIG. 21 is an exemplary view illustrating the channel polarization in a 2×2 polar code module.
Figure 22:
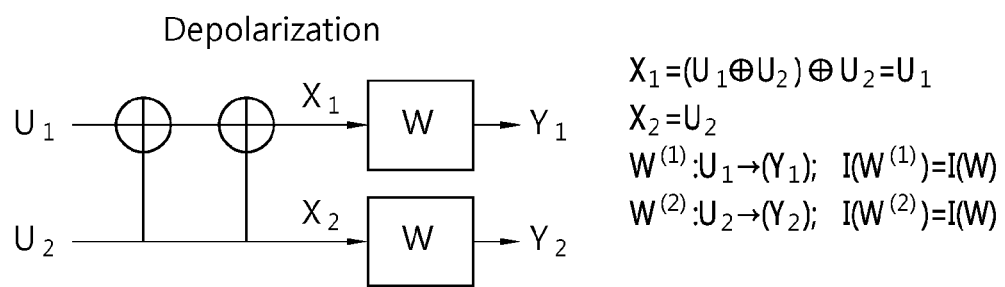
FIG. 22 is an exemplary view illustrating the channel depolarization in a 2×2 polar code module.
Figure 23:
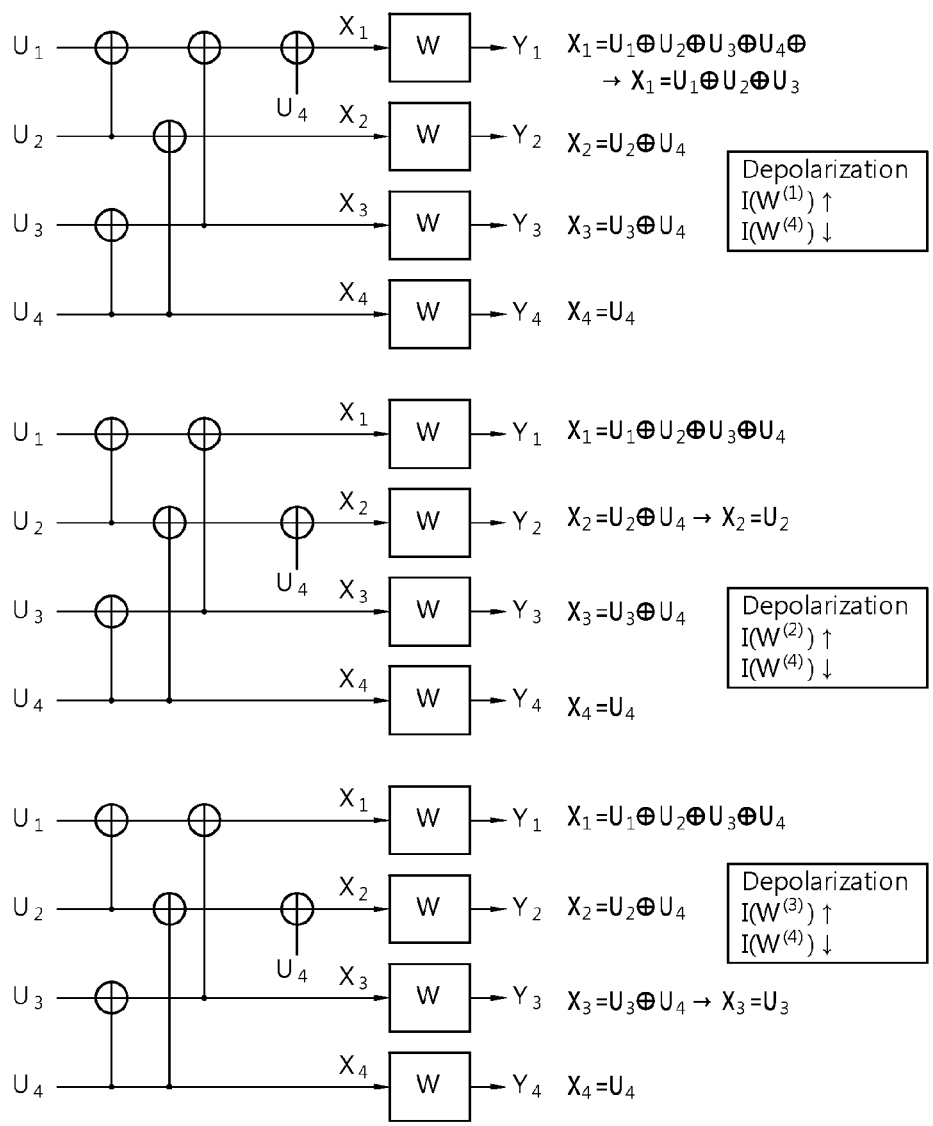
FIG. 23 is an exemplary view illustrating the channel depolarization in a 4×4 polar code module.
Figure 24:
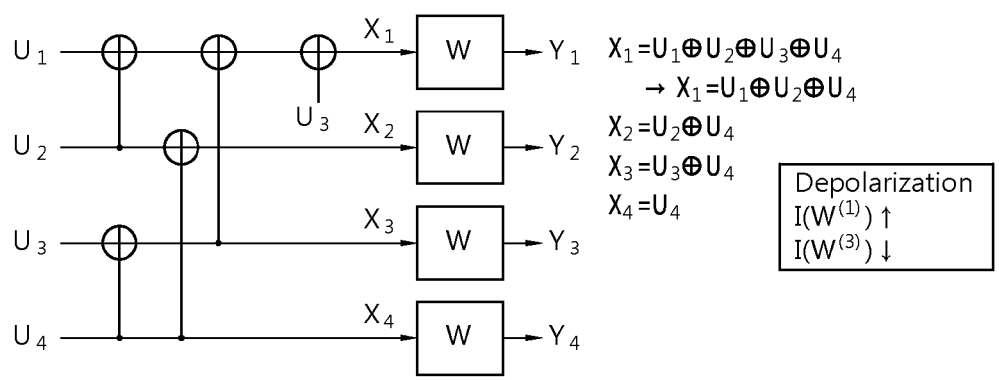
FIG. 24 is another exemplary view illustrating the channel depolarization in a 4×4 polar code module.
Figure 25:
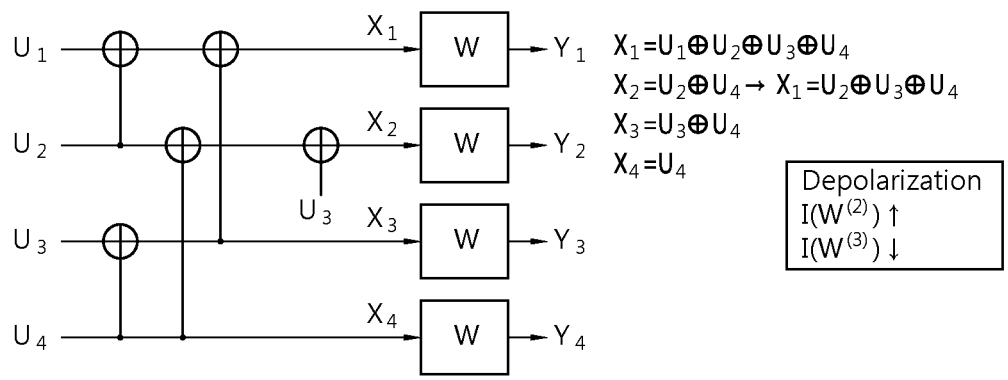
FIG. 25 is an exemplary view illustrating the channel polarization in a 4×4 polar code module.
Figure 26:
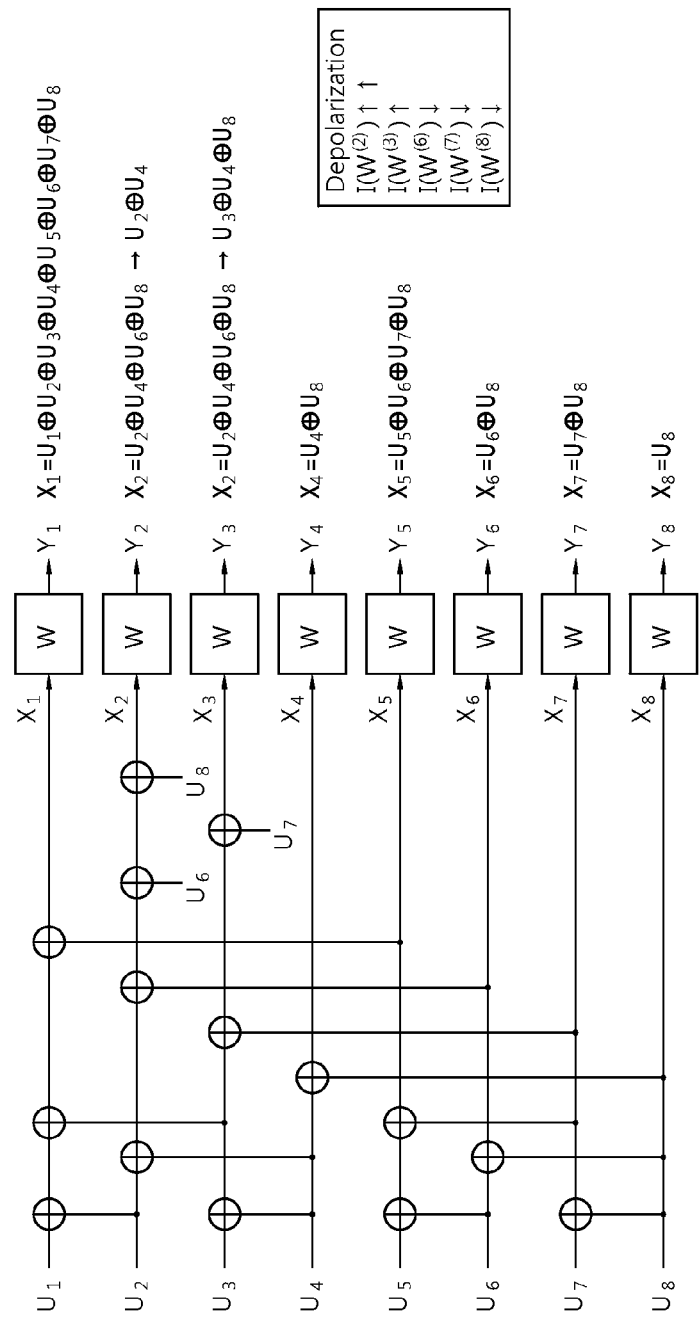
FIG. 26 is an exemplary view illustrating the channel depolarization in a 8∴8 polar code module.

FIG. 21 is an exemplary view illustrating the channel polarization in a 2×2 polar code module. FIG. 22 is an exemplary view illustrating the channel depolarization in a 2×2 polar code module. FIG. 23 is an exemplary view illustrating the channel depolarization in a 4×4 polar code module. FIG. 24 is another exemplary view illustrating the channel depolarization in a 4×4 polar code module. FIG. 25 is an exemplary view illustrating the channel polarization in a 4×4 polar code module. And FIG. 26 is an exemplary view illustrating the channel depolarization in a 8×8 polar code module.

Referring to FIG. 21, FIG. 22, FIG. 23, FIG. 24, FIG. 25 and FIG. 26, the present invention proposes channel depolarization. To describe it, consider a simple 2×2 polar code module in FIG. 12. As shown in the drawing, a channel $W^{(1)}$ corresponding to an input bit $U_1$ and $W^{(2)}$ corresponding to $U_2$ are polarized. That is, the following is valid:

$$I(W^{(1)}) \leq I(W) \leq I(W^{(2)})$$ [Equation 35]

Here, I(W) is the amount of mutual information of an original channel when a polar code is not used. The reason that channels are polarized is that XOR operation of the second input bit $U_2$ is performed with respect to the first branch $X_1$. This is the basic concept of an existing polar code.

Now, depolarize the two channels $W^{(1)}$ and $W^{(2)}$. To this end, XOR operation of $U_2$ is performed with respect to $X_1$ again. This depolarization is shown in FIG. 22, and, in this case, the following is valid:

$$I(W^{(1)}) = I(W) = I(W^{(2)})$$ [Equation 36]

That is, the two bit channels come to have the same amount of mutual information, and it is called depolarization. This concept may be applied to a polar code which is greater in size. In FIG. 23, effects of depolarization may be achieved by performing XOR operation of $U_4$ with respect to the first, second, and third branches in a 4×4 polar code. In FIG. 24, effects of depolarization effects may be achieved by performing XOR operation of $U_3$ with respect to the first branch in a 4×4 polar code. FIG. 25 shows a case where XOR operation of $U_3$ is performed with respect to the second branch in a 4×4 polar code. However, in this case, polarization rather than depolarization occurs. That is, $I(W^{(2)})$ decreases, but $I(W^{(3)})$ increases. As such, even in the case where the same $U_3$ is subject to XOR operation, occurrence of polarization or depolarization is determined depending on a branch with respect to which the XOR operation is performed. Generally, in a case where XOR operation of $U_j$ is performed with respect to a certain branch, if the branch consists of XOR of various other inputs including $U_j$, depolarization occurs. However, if the branch consists of XOR of various other inputs not including $U_j$, polarization occurs. Thus, in order to achieve effects of depolarization by performing XOR operation of a certain input bit $U_j$ with respect to a certain branch, it is necessary to check that the branch consists of XOR of various inputs including $U_j$. This concept of depolarization may be extended by a bigger polar code, and greater effects of depolarization may be achieved by performing XOR operation, not of a single input $U_j$, but of various inputs $U_j$ simultaneously. This concept is shown in FIG. 26.

To describe depolarization mathematically, several symbols are defined in the following.

Figure 27:
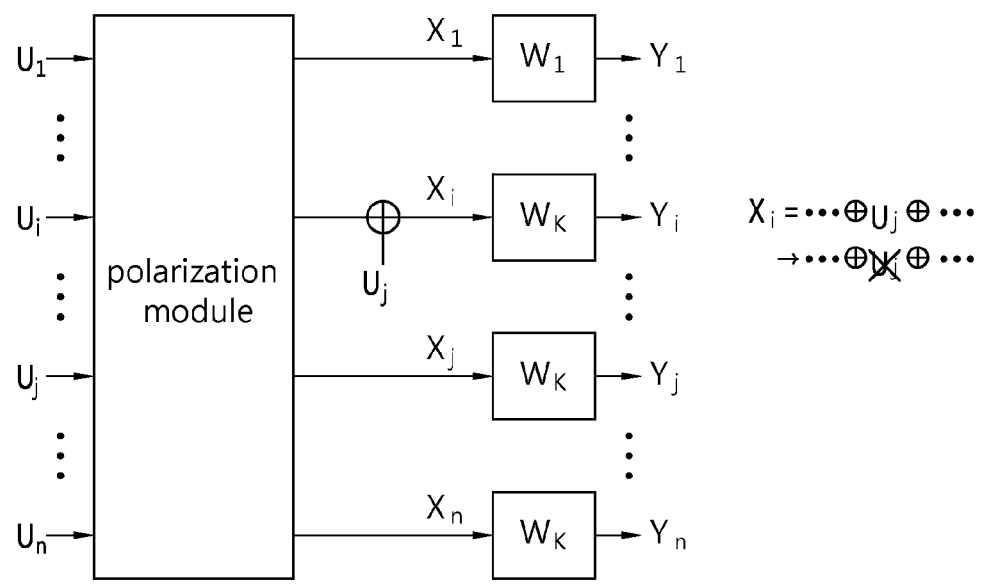
FIG. 27 is an exemplary view illustrating the channel depolarization in a general polar code module.

FIG. 27 is an exemplary view illustrating the channel depolarization in a general polar code module.

First, a branch $X_i$ is given as XOR of various input bits including $U_j$. But, i<j. In addition, want to increase the amount of mutual information $I(W^{(i)})$ of the i-th bit channel $W^{(i)}$ but decrease the amount of mutual information $I(W^{(j)})$ of the j-th bit channel $W^{(j)}$. This objective may be achieved by depolarization which is made by performing XOR of an input bit $U_j$ with respect to a branch $X_i$. This concept is shown in FIG. 27. A bit channel corresponding to the input bit $U_i$ after depolarization is indicated by $W_+^{(i)}$, and a bit channel corresponding to the input bit $U_j$ is indicated by $W_-^{(j)}$. In addition, depolarization which occurs in this case is represented using $\mathbb{D}(\bullet)$, $\mathbb{D}_+(\bullet)$, and $\mathbb{D}_-(\bullet)$, as below:

$$(W_+^{(i)}, W_-^{(j)}) = \mathbb{D}(W^{(i)}, W^{(j)}) \quad \text{[Equation 37]}$$

$$W_+^{(i)} = \mathbb{D}_+(W^{(i)}, W^{(j)}) \quad \text{[Equation 38]}$$

$$W_-^{(j)} = \mathbb{D}_-(W^{(i)}, W^{(j)}) \quad \text{[Equation 39]}$$

In this case, the following is valid.

$$I(W_+^{(i)}) \geq I(W^{(i)}) \text{ and } I(W_-^{(j)}) \leq I(W^{(j)}) \quad \text{[Equation 40]}$$

When a polar code transmitter performs XOR computation for depolarization, a receiver simply performs decoding by using a SIC decoder that is used for an existing polar code.

3.2 Polar Code Based on Channel Depolarization.

By using channel depolarization, described in the previous chapter, in some of bit channels of a polar code, it is possible to improve performance.

Figure 28:
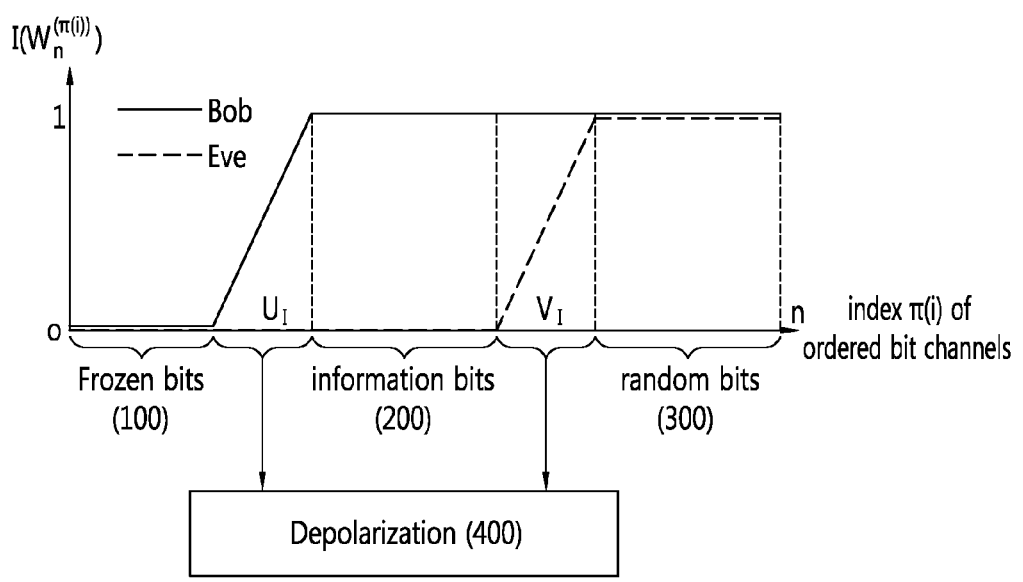
FIG. 28 is an exemplary view illustrating the mutual information of the channel for the polar code with a channel depolarization.

FIG. 28 is an exemplary view illustrating the mutual information of the channel for the polar code with a channel depolarization.

Referring to FIG. 28, consider a bit channel i belonging to a set $U_I$ and a bit channel j belonging to a set $V_I$: $i \in U_I$ and $j \in V_I$. A branch $X_i$ corresponding to an input bit $U_i$ is given as XOR of various other input bits including an input bit $U_j$. But, $i<j$. As discussed in the previous chapter, the amount of mutual information of bit channels belonging to $U_I$ needs to increase, while the amount of mutual information of bit channels belonging to $V_I$.

To this end, the i-th bit channel belonging to $U_I$ and the j-th bit channel belonging to $V_I$ are depolarized 400. In this case, depolarization at Bob and Eve may be represented as below:

$$(W_{b+}^{(i)}, W_{b-}^{(j)}) = \mathbb{D}(W_b^{(i)}, W_b^{(j)}) \quad \text{[Equation 41]}$$

$$W_{b+}^{(i)} = \mathbb{D}_+(W_b^{(i)}, W_b^{(j)}) \quad \text{[Equation 42]}$$

$$W_{b-}^{(j)} = \mathbb{D}_-(W_b^{(i)}, W_b^{(j)}) \quad \text{[Equation 43]}$$

$$(W_{c+}^{(i)}, W_{c-}^{(j)}) = \mathbb{D}(W_c^{(i)}, W_c^{(j)}) \quad \text{[Equation 44]}$$

$$W_{c+}^{(i)} = \mathbb{D}_+(W_c^{(i)}, W_c^{(j)}) \quad \text{[Equation 45]}$$

$$W_{c-}^{(j)} = \mathbb{D}_-(W_c^{(i)}, W_c^{(j)}) \quad \text{[Equation 46]}$$

Due to depolarization, the following is valid:

$$I(W_{b+}^{(i)}) \geq I(W_b^{(i)}) \text{ and } I(W_{b-}^{(j)}) \leq I(W_b^{(j)}) \quad \text{[Equation 47]}$$

$$I(W_{c+}^{(i)}) \geq I(W_c^{(i)}) \text{ and } I(W_{c-}^{(j)}) \leq I(W_c^{(j)}) \quad \text{[Equation 48]}$$

To maximize a security bit transmission rate of a polar code, there is proposed a new method, which is Method 7. In Method 7, $K_{dcp}$, which is the number of pairs of bit channels to be depolarized, is maximized. In this case, decoding reliability at Bob and a security level at Eve should always satisfy a preset standard. Due to depolarization, gray bit channels belonging to $U_I$ are converted into reliable channels, and gray bit channels belonging to $V_I$ are converted into channels of sustainable security. Method 7 is similar to Method 1 and Method 2 in that the number of bits to be further transmitted is maximized. However, Method 7 is distinguishable in that mutual information is transferred to a bit channel in less need of mutual information to a bit channel in more need of mutual information without incurring any loss of the mutual information.

(Method 7: Depolarization I)

$$\max_{\{(i_k, j_k): k=1, \ldots, K_{dcp}\}} K_{dcp}$$

subject to $$I(\mathbb{D}_+(W_b^{i_k, j_k})) \geq \delta_I^U, k=1,2,\ldots,K_{dcp}$$

$$I(\mathbb{D}_-(W_b^{i_k, j_k})) \geq \delta_I^U, k=1,2,\ldots,K_{dcp}$$

$$I(\mathbb{D}_+(W_c^{i_k, j_k})) \leq \delta_I^L, k=1,2,\ldots,K_{dcp}$$

$$I(\mathbb{D}_-(W_c^{i_k, j_k})) \geq \delta_I^L, k=1,2,\ldots,K_{dcp}$$

$$i_k \in U_I, k=1,2,\ldots,K_{dcp}$$

$$j_k \in V_I, k=1,2,\ldots,K_{dcp}$$

$$(i_{k_1}, j_{k_1}) \cap (i_{k_2}, j_{k_2}) = 0, k_1 \neq k_2$$

If Method 7 is used, it is possible to maximize the number of bits to be further transmitted due to depolarization, but it may lead to high complexity which is required to optimally determine a pair to be depolarized $\{(i_k, j_k): k=1, \ldots, K_{dcp}\}$. Considering this, there may be proposed a method based on depolarization with reduced complexity, which is Method 8. Method 8 is similar to Method 3 and 4 in that complexity is reduced.

(Method 8: Depolarization II)

Arrange elements of $U_I$ in an increasing order of the amount of mutual information, and then present a set arranged in this manner as $U_I = \{u_1, \ldots, u_{B_b}\}$ Arrange elements of $V_I$ in an increasing order of the amount of information, and then present a set arranged in this manner as $V_I = \{v_1, \ldots, v_{B_e}\}$

```
ψ_dcp ← 0
For p = 1: 1: B_b
    For q = B_e: -1: 1
        If v ∉ ψ_dcp AND I(𝔻_+(W_b^{up,vq})) ≥ δ_1^U AND
I(𝔻_- W_b^{up,vq})) ≥ δ_1^U AND I(𝔻_+(W_c^{up,vq})) ≤ δ_1^L AND I(𝔻_ W_c^{up,vq})) ≤ δ_1^L
            ψ_dcp ← ψ_dcp ∪ (v_q)
            break
        End
    End
End
```

Figure 29:
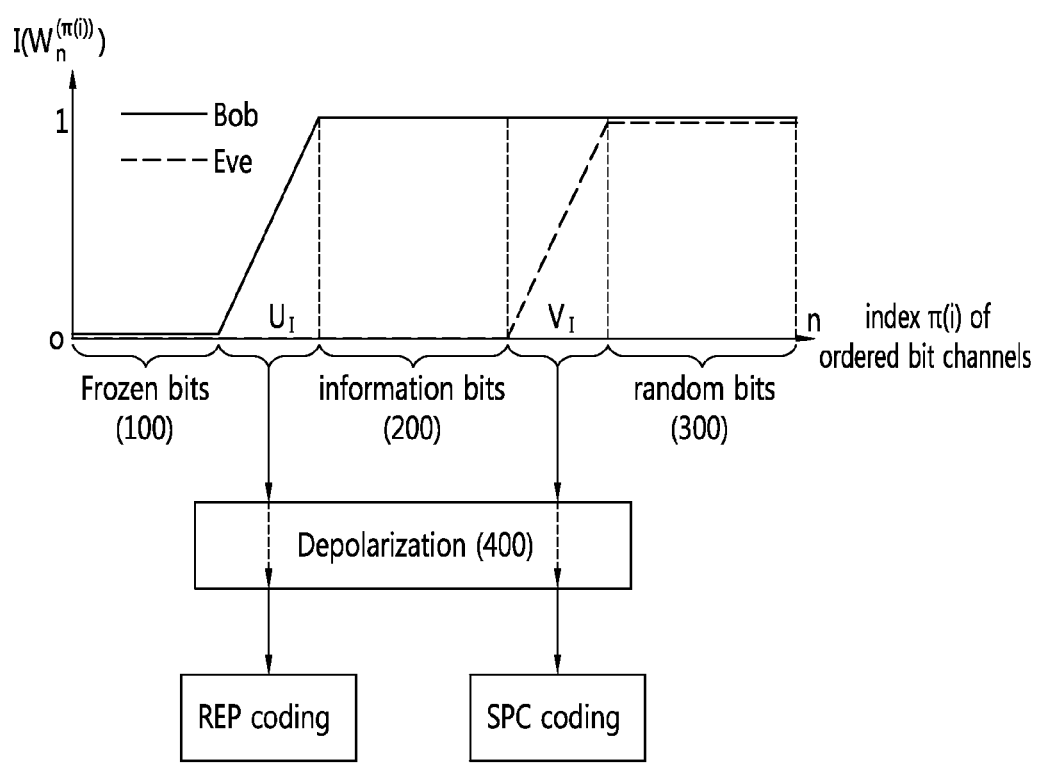
FIG. 29 is an exemplary view illustrating the mutual information of the channel for the polar code with a channel depolarization, REP coding and SPC coding.

FIG. 29 is an exemplary view illustrating the mutual information of the channel for the polar code with a channel depolarization, REP coding and SPC coding.

By combining the concept of depolarization proposed in this chapter with REP coding and SPC coding proposed in the previous chapter, it is possible to improve performance of a polar code, and this concept is shown in FIG. 29 and referred to as Method 9.

(Method 9: Depolarization, DEP Coding and SPC Coding)

Step 1: Depolarization

Use Method 7 or Method 8 to depolarize bit channels belonging to $U_1$ and bit channels belonging to $V_I$ Step 2a: REP coding Use Method 1, Method 3, or Method 5 with respect to bit channels belonging to $U_I$ Step 2b: SPC coding Use Method 2, Method 4, or Method 6 with respect to bit channels belonging to $V_I$

3.3 Improved Performance of Non-Security Communication Polar Code Due to Depolarization and REP Coding The present invention has so far proposed various methods to improve performance of a security communication polar code. The proposed methods may be used to improve performance of a non-security communication polar code. In the case of non-security communications, a transmitter is Alice, a receiver is Bob, and Eve does not exist.

Figure 30:
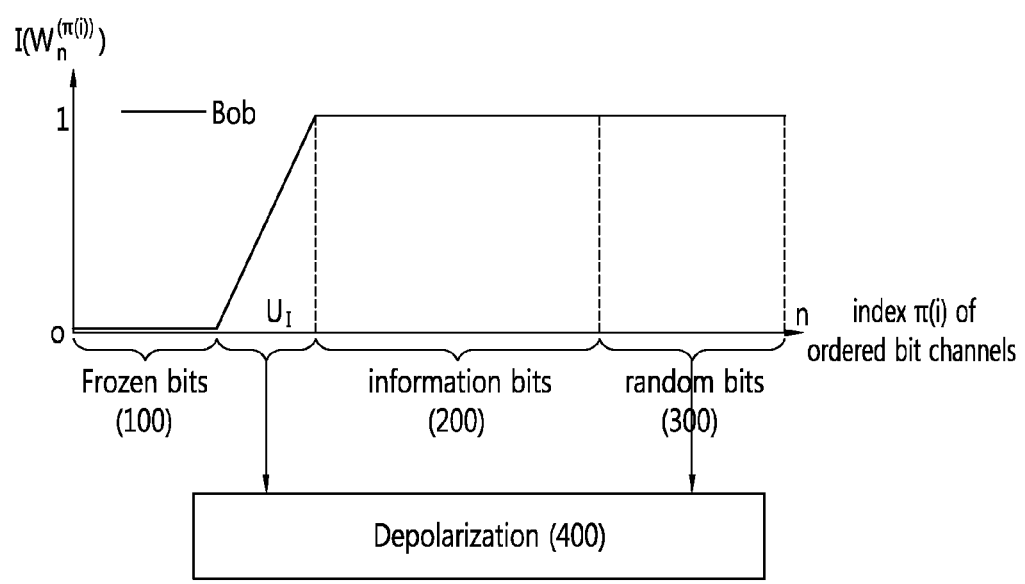
FIG. 30 is an exemplary view illustrating the mutual information of the channel for a non-security polar code with a channel depolarization.

FIG. 30 is an exemplary view illustrating the mutual information of the channel for a non-security polar code with a channel depolarization. And FIG. 31 is an exemplary view illustrating the mutual information of the channel for a non-security polar code with a channel depolarization and REP coding.

As shown in FIG. 30, performance of a non-security communication polar code may be improved using depolarization 400 proposed in this chapter. The basic concept is that mutual information of the rightmost bit channels are extremely close to 0 so that the mutual information may be greater than a given standard $\delta_I^U$ even when the mutual information is somewhat reduced. In contrary, a value of mutual information of channel bits belonging to $U_I$ is now smaller than the given standard $\delta_I^U$ but may increase to become greater than $\delta_I^U$ if the amount of mutual information is increased by depolarization 400.

Figure 31:
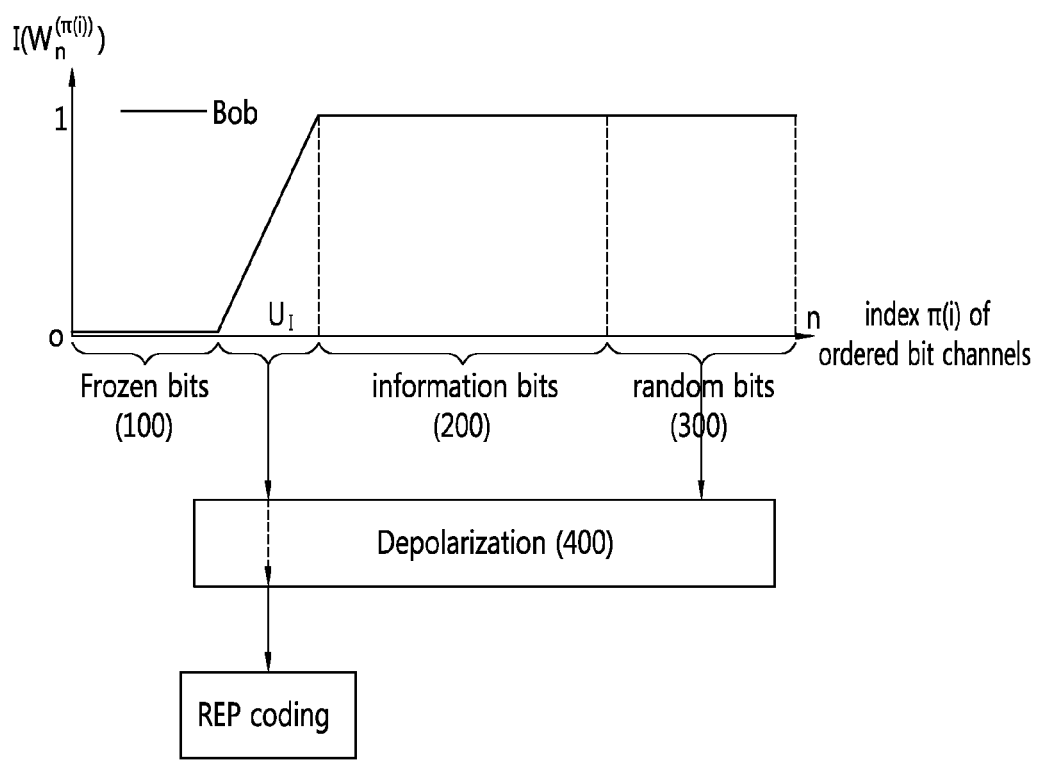
FIG. 31 is an exemplary view illustrating the mutual information of the channel for a non-security polar code with a channel depolarization and REP coding.

As shown in FIG. 31, by using depolarization and REP coding simultaneously, it is possible to further improve performance of a non-security communication polar code.

Figure 32:
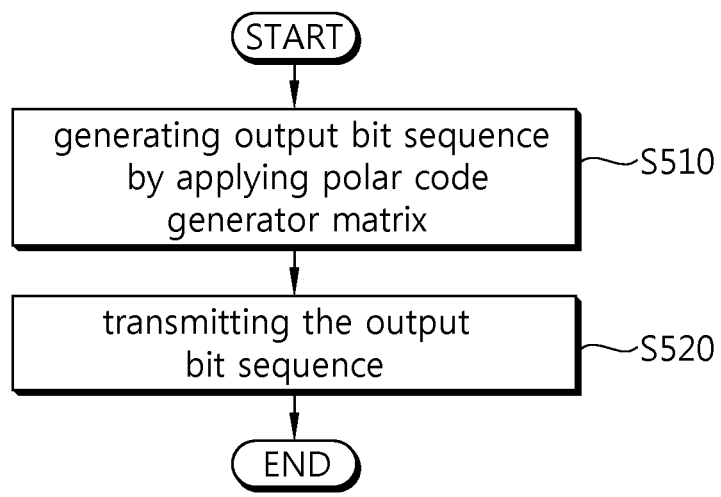
FIG. 32 is a flowchart illustrating information bits transmission method according to an embodiment of the present invention.

FIG. 32 is a flowchart illustrating information bits transmission method according to an embodiment of the present invention.

According to FIG. 32, a wireless communication system generate an output bit sequence by applying a polar code generator matrix to an input bit sequence, as discloses in embodiments of FIG. 3 to FIG. 16 (step S510). More specifically, the input bit sequence includes frozen bits, first information bits, second information bits, third information bits and random bits. The first information bits correspond to gray bit channels for Bob and bad bit channels for Eve. The third information bits correspond to good bit channels for Bob and gray bit channels for Eve. The frozen bits correspond to bad bit channels for Bob and bad bit channels for Eve. The frozen bits is predetermined value updated in every frame of the output bit sequence. The random bits correspond to good bit channels for Bob and good bit channels for Eve. The good bit channels, the gray bit channels and bad bit channels are determined based on mutual information obtained from relationship between the input bit sequence and the output bit sequence, according to the Definition 2. The output bit sequence corresponded with the first information bits is encoded by using REP coding. And the output bit sequence corresponded with the third information bits is encoded by using SPC coding.

Figure 33:
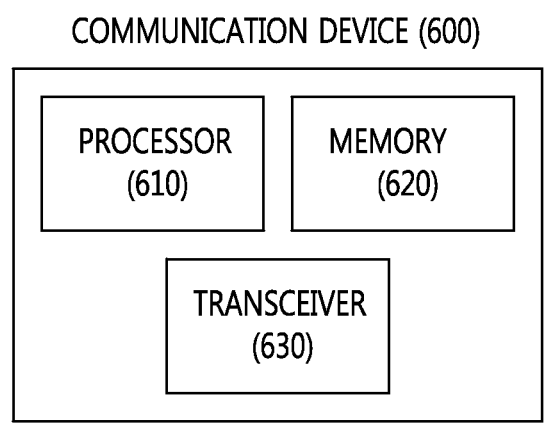
FIG. 33 is a block diagram illustrating a security communication system according to an embodiment of the present invention.

And, a wireless communication system transmitting the output bit sequence to Bob (step S520), FIG. 33 is a block diagram illustrating a security communication system according to an embodiment of the present invention.

The communication device 600 includes a processor 610, a memory 620 and transceiver 630. The memory 620 is connected to the processor 610, and stores various information for driving the processor 610. The transceiver 630 is connected to the processor 610, and sends and receives signals. The processor 610 implements suggested functions, procedures, and/or methods. In the above embodiment, the operation of the wireless communication system of FIG. 32 may be implemented by the processor 610.

The processor 610 may include Application-Specific Integrated Circuits (ASICs), other chipsets, logic circuits, and/or data processors. The memory 620 may include Read-Only Memory (ROM), Random Access Memory (RAM), flash memory, memory cards, storage media and/or other storage devices. The transceiver 630 may include a baseband circuit for processing a signal. When the above-described embodiment is implemented in software, the above-described scheme may be implemented using a module (i.e., process or function, etc) which performs the above function. The module may be stored in the memory 620 and executed by the processor 610. The memory 620 may be disposed to the processor 610 internally or externally and connected to the processor 610 using a variety of well-known means.

In the present invention, a polar code is used for security communications wherein performance thereof is improved so that a transmission rate may be better than that of an existing polar code. More specifically, with a security level at Eve being guaranteed to be at or above a given standard, it is possible to improve a transmission rate by polar coding. Reliability and security are defined in light of both of a decoding error probability and the amount of mutual information, and a polar code method improved based on the definition has been proposed.

First, in a case where a standard of reliability and security is given in light of an error probability, an SPN or any other channel code is used. Due to error amplification by an SPN, this proposed method may lead to a transmission rate improved more than an existing method. Or, by using various channel codes (typically, an MDS code) along with a polar code, it is possible to improve a transmission rate of security data. In addition, by dynamically allocating frozen bits of a polar code, it is possible to enhance security.

Second, in a case where a standard of reliability and security is given in light of mutual information, an REP code or an SPC code is used, and it is easy to encode the REP code or the SPC code. Considering that complexity may become greater when decoding the REP code or the SPC code is combined with SIC decoding, new methods requiring low complexity have been proposed.

Third, there has been proposed the concept of channel depolarization which is opposite to channel polarization proposed in the existing polar coding method, and, by using this concept, there has been proposed new method of converting gray bit channels into reliable bit channels or bit channels of sustainable security. If the proposed methods are used, it is possible to improve a transmission rate compared to an existing polar code while minimizing a loss of mutual information.

Lastly, if depolarization or REP coding proposed in the present invention for security communication is applied to an existing non-security polar code, it is possible to improve a transmission rate while maintaining reliability at or above a certain standard.

While the present invention has been particularly shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method for providing a secure transmission based on a polar code, the method comprising:
    encoding a substitution permutation network (SPN) based input bit sequence with a polar code generator matrix thereby generating an SPN based output bit sequence;
    selecting good bit channels for a target receiver, bad bit channels for an eavesdropper and gray bit channels for the target receiver and the eavesdropper; and
    transmitting the SPN based output bit sequence,
    wherein the SPN based output bit sequence includes first information bits, second information bits and third information bits,
    wherein the first information bits are transmitted through the gray bit channels for the target receiver and the bad bit channels for the eavesdropper,
    wherein the second information bits are transmitted through the good bit channels for the target receiver and the bad bit channels for the eavesdropper,
    wherein the third information bits are transmitted through the good bit channels for the target receiver and the gray bit channels for the eavesdropper,
    wherein if the first and second information bits are transmitted through the bad bit channels for the eavesdropper, an SPN increases errors in the first and second information bits, and
    wherein the output bit sequence is received and decoded without error in a decoder.

2. The method of claim 1, wherein the SPN based output bit sequence further includes frozen bits corresponding to bad bit channels for the target receiver and bad bit channels for the eavesdropper.

3. The method of claim 2, wherein the frozen bits include predetermined bit values updated in every frame of the output bit sequence.

4. The method of claim 1, wherein the SPN based output bit sequence further includes random bits corresponding to good bit channels for the target receiver and good bit channels for the eavesdropper.

5. The method of claim 1, wherein the good bit channels, the gray bit channels and the bad bit channels are determined based on mutual information obtained from relationships between the input bit sequence and the output bit sequence.

6. The method of claim 5, wherein if the mutual information of a bit of the input bit sequence is higher than a first threshold, the bit of the input bit sequence corresponds to the good bit channels.

7. The method of claim 6, wherein if the mutual information of a bit of the input bit sequence is lower than a second threshold, the bit of the input bit sequence corresponds to the bad bit channels.

8. The method of claim 7, wherein the first threshold is greater than the second threshold.

9. The method of claim 8, wherein if a bit of the input bit sequence is not related to the good bit channels and the bad bit channels, the bit of the input bit sequence corresponds to the gray bit channels.

10. The method of claim 1, wherein the first information bits are encoded by using a repetition (REP) coding.

11. The method of claim 1, wherein the third information bits are encoded by using a single parity check (SPC) coding.

12. A device for providing a secure transmission based on a polar code, the device comprising:
    a transceiver configured to transmit and receive radio signals; and
    a processor operatively coupled with the transceiver and configured to:
        encode a substitution permutation network (SPN) based input bit sequence with a polar code generator matrix thereby generating an SPN based output bit sequence,
        select good bit channels for a target receiver, bad bit channels for an eavesdropper and gray bit channels for the target receiver and the eavesdropper, and
        control the transceiver to transmit the SPN based output bit sequence,
    wherein the SPN based output the input bit sequence includes first information bits, second information bits and third information bits,
    wherein the first information bits are transmitted through the gray bit channels for the target receiver and the bad bit channels for the eavesdropper,
    wherein the second information bits are transmitted through the good bit channels for the target receiver and the bad bit channels for the eavesdropper,
    wherein the third information bits are transmitted through the good bit channels for the target receiver and the gray bit channels for the eavesdropper,
    wherein if the first and second information bits are transmitted through the bad bit channels for the eavesdropper, an SPN increases errors in the first and second information bits, and
    wherein the output bit sequence is received and decoded without error in a decoder.

13. The device of claim 12, wherein the SPN based output bit sequence further includes frozen bits corresponding to bad bit channels for the target receiver and bad bit channels for the eavesdropper.

14. The device of claim 13, wherein the frozen bits include predetermined bit values updated in every frame of the output bit sequence.

15. The device of claim 12, wherein the SPN base output bit sequence further includes random bits corresponding to good bit channels for the target receiver and good bit channels for the eavesdropper.

16. The device of claim 12, wherein the good bit channels, the gray bit channels and the bad bit channels are determined based on mutual information obtained from relationships between the input bit sequence and the output bit sequence.

17. The device of claim 16, wherein if the mutual information of a bit of the input bit sequence is higher than a first threshold, the bit of the input bit sequence corresponds to the good bit channels.

18. The device of claim 17, wherein if the mutual information of a bit of the input bit sequence is lower than a second threshold, the bit of the input bit sequence corresponds to the bad bit channels.

* * * * *